(12) United States Patent
Higuchi et al.

(10) Patent No.: US 11,302,119 B2
(45) Date of Patent: Apr. 12, 2022

(54) TOLL COLLECTION FACILITY, ONBOARD UNIT, TOLL COLLECTION SYSTEM, TOLL COLLECTION METHOD, AND PROGRAM

(71) Applicant: MITSUBISHI HEAVY INDUSTRIES MACHINERY SYSTEMS, LTD., Hyogo (JP)

(72) Inventors: Tatsuya Higuchi, Tokyo (JP); Kazuyoshi Kitajima, Tokyo (JP); Keiji Terasaka, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 736 days.

(21) Appl. No.: 16/087,387

(22) PCT Filed: Mar. 31, 2016

(86) PCT No.: PCT/JP2016/061638
§ 371 (c)(1),
(2) Date: Sep. 21, 2018

(87) PCT Pub. No.: WO2017/168763
PCT Pub. Date: Oct. 5, 2017

(65) Prior Publication Data
US 2021/0183168 A1 Jun. 17, 2021

(51) Int. Cl.
*G07B 15/06* (2011.01)
*G06Q 20/34* (2012.01)
*G06Q 50/30* (2012.01)

(52) U.S. Cl.
CPC ......... *G07B 15/063* (2013.01); *G06Q 20/352* (2013.01); *G06Q 50/30* (2013.01)

(58) Field of Classification Search
CPC .............................. G07B 15/063; G06Q 20/352
(Continued)

(56) References Cited

U.S. PATENT DOCUMENTS 5,440,109 A    8/1995   Hering et al.
5,581,249 A * 12/1996   Yoshida ............... G07B 15/063
                                                          235/384
(Continued)

FOREIGN PATENT DOCUMENTS

JP           H7-6236 A      1/1995
JP           H7-14043 A      1/1995
(Continued)

OTHER PUBLICATIONS

International Search Report in International Application No. PCT/JP2016/061638, dated Jul. 19, 2016, 4pp.
(Continued)

*Primary Examiner* — Allyson N Trail
(74) *Attorney, Agent, or Firm* — Kanesaka Berner and Partners LLP

(57) ABSTRACT

Provided is a toll collection facility including a wireless communication device provided to a lane, and a charge processing device configured to execute read processing and write processing, for charge processing data, on a communication target device installed in a vehicle traveling on the lane, via the wireless communication device, based on a predetermined processing procedure. The charge processing device includes a scenario information generation unit configured to generate and send scenario information indicating at least a part of the processing procedure. The wireless communication device includes a recording processing unit configured to record the scenario information in an internal recording medium, and a scenario processing unit configured to execute read processing and write processing, for the charge processing data, on the communication target device, based on the scenario information.

5 Claims, 25 Drawing Sheets

(58) Field of Classification Search
USPC .............................. 705/13, 39; 235/384, 492
See application file for complete search history.

(56) References Cited

U.S. PATENT DOCUMENTS

| | | | |
|---|---|---|---|
| 2013/0018705 A1* | 1/2013 | Heath | G06Q 20/3224 705/13 |
| 2013/0238405 A1* | 9/2013 | Roesner | G06K 19/07345 705/13 |
| 2014/0081848 A1* | 3/2014 | Leopold | G06Q 10/10 705/39 |
| 2014/0149190 A1* | 5/2014 | Robinson | G07B 15/063 705/13 |
| 2015/0062340 A1* | 3/2015 | Datta | H04N 5/2252 348/148 |
| 2015/0203149 A1* | 7/2015 | Katayama | B62D 5/003 701/41 |
| 2015/0279122 A1* | 10/2015 | Lorenzen | H04L 67/12 705/13 |
| 2015/0326283 A1* | 11/2015 | Nagata | H04M 15/61 370/328 |
| 2016/0005037 A1* | 1/2016 | Eilertsen | G06Q 20/3224 705/44 |
| 2016/0185358 A1* | 6/2016 | Todasco | B60K 28/02 701/48 |
| 2016/0203651 A1* | 7/2016 | Heath | H04W 4/40 705/13 |
| 2017/0323490 A1* | 11/2017 | Tijink | G07B 15/063 |
| 2019/0222350 A1* | 7/2019 | Maeda | G08G 1/09 |
| 2019/0228593 A1* | 7/2019 | Liu | G08G 1/0116 |
| 2020/0174093 A1* | 6/2020 | Ono | G01S 3/48 |
| 2020/0400776 A1* | 12/2020 | Sotoyama | H04W 4/40 |
| 2021/0028874 A1* | 1/2021 | Yamaguchi | H04W 4/44 |
| 2021/0125418 A1* | 4/2021 | Gravelle | G07B 15/063 |

FOREIGN PATENT DOCUMENTS

| | | |
|---|---|---|
| JP | 2001-28066 A | 1/2001 |
| JP | 2001-34799 A | 2/2001 |
| JP | 2002-76965 A | 3/2002 |
| JP | 2002-109593 A | 4/2002 |
| JP | 2015-118410 A | 6/2015 |

OTHER PUBLICATIONS

Written Opinion in International Application No. PCT/JP2016/061638, dated Jul. 19, 2016, 9pp.

* cited by examiner

TOLL COLLECTION FACILITY, ONBOARD UNIT, TOLL COLLECTION SYSTEM, TOLL COLLECTION METHOD, AND PROGRAM

RELATED APPLICATIONS

The present application is a National Phase of International Application Number PCT/JP2016/061638 filed Mar. 31, 2016.

TECHNICAL FIELD

The present invention relates to a toll collection facility, an onboard unit, a toll collection system, a toll collection method, and a program.

BACKGROUND ART

Some tollgates for toll roads such as highways employ a free flow system enabling a vehicle to go through charge processing without stopping. Thus, the vehicle can swiftly pass through the tollgates (Patent Document 1, for example). Specifically, this feature of the system is achieved through wireless communications between an onboard unit, installed in a traveling vehicle, and a charge processing device, installed on a roadside via a wireless communication device.

CITATION LIST

Patent Document

Patent Document 1: JP 2001-34799 A

DISCLOSURE OF THE INVENTION

Problem to be Solved by the Invention

The charge processing device in the free flow system described above needs to complete the charge processing within a short period of time. In other words, charge processing data related to the charge processing needs to be sent and received within a period of time between entrance and exit of the traveling vehicle to and from a communicable area of the wireless communication device.

For example, to acquire the charge processing data from the onboard unit, the charge processing device first sends a command for requesting charge processing data to the wireless communication device. The wireless communication device instructs the onboard unit to read the charge processing data, in response to the command. Then, the onboard unit executes processing of reading the charge processing data from an integrated circuit (IC) card inserted in the onboard unit. The onboard unit sends the charge processing data, read from the IC card, to the wireless communication device. The wireless communication device sends the charge processing data to the charge processing device. The above-described communications between the charge processing device and the wireless communication device and between the wireless communication device and the onboard unit, as well as the processing of reading data between the onboard unit and the IC card and the like result in a long communication time required for sending and receiving the charge processing data in the system as a whole. Thus, the charge processing might be difficult to complete within a short period of time.

The present invention is made in view of the above problem, and provides a toll collection facility, an onboard unit, a toll collection system, a toll collection method, and a program enabling charge processing to be efficiently executed.

Means for Solving Problem

A toll collection facility (20A) according to a first aspect of the present invention includes a wireless communication device (200) provided to a lane, and a charge processing device (210) configured to execute read processing and write processing, for charge processing data (D1), on a communication target device (10A) installed in a vehicle (A) traveling on the lane, via the wireless communication device, based on a predetermined processing procedure. The charge processing device includes a scenario information generation unit (212a) configured to generate and send scenario information (D2) indicating at least a part of the processing procedure. The wireless communication device includes a recording processing unit (202a) configured to record the scenario information received from the charge processing device, in an internal recording medium (203), and a scenario processing unit (202b) configured to execute read processing and write processing, for the charge processing data, on the communication target device, based on the scenario information recorded in the internal recording medium.

With this configuration, the scenario processing unit of the wireless communication device execute read processing and write processing, for the charge processing data, on the communication target device, based on the scenario information sent from the scenario information generation unit of the wireless communication device. Thus, the scenario processing unit can autonomously determine and execute processing to be executed on the communication target device without waiting for a command from the charge processing device. As a result, the number of communications between the charge processing device and the wireless communication device is reduced, whereby efficient charge processing can be achieved.

According to a second aspect of the present invention, in the toll collection facility according to the above-described aspect, the scenario information generation unit is configured to generate and send the scenario information when the charge processing device starts.

With this configuration, after the charge processing device has started, the scenario processing unit of the wireless communication device can autonomously determine and execute the processing to be executed on the communication target device without receiving the scenario information from the charge processing device. Thus, the number of communications between the charge processing device and the wireless communication device can further be reduced.

An onboard unit (10B) according to a third aspect of the present invention includes a wireless communication unit (100) configured to wirelessly send and receive data, a copy processing unit (131) configured to read, when a card-type portable recording medium (C) is inserted, charge processing data (D1) recorded in the card-type portable recording medium and copy the charge processing data in an internal recording medium (120), a read processing unit (132) configured to read and send, when a read command for the charge processing data is received via the wireless communication unit, the charge processing data copied in the internal recording medium, a write processing unit (133) configured to write, when a write command for new charge processing data is received via the wireless communication unit, the received new charge processing data to the internal recording medium, and a card update unit (134) configured to update, after the new charge processing data has been written to the internal recording medium, the charge processing data recorded in the card-type portable recording medium, based on the new charge processing data written to the internal recording medium.

With this configuration, the copy processing unit copies the charge processing data, recorded in the inserted card-type portable recording medium, to the internal recording medium. Thus, upon receiving the read command and the write command for the charge processing data, the read processing unit executes the read and the write processing for the charge processing data on the internal recording medium featuring a higher access speed than the card-type portable recording medium. Thus, the onboard unit can send the charge processing data with a shorter communication time compared with a configuration where the read and the write processing for the charge processing data is executed on the card-type portable recording medium each time a command is received.

According to a fourth aspect of the present invention, the card update unit is configured to update the charge processing data recorded in the card-type portable recording medium, after sending and reception of the charge processing data by the wireless communication unit have been completed.

This configuration enables the wireless communication unit to terminate the processing of sending and receiving the charge processing data without waiting for completion of the updating of the charge processing data recorded in the card-type portable recording medium. Thus, the communication time involved in the sending and reception of the charge processing data by the onboard unit can further be reduced.

A toll collection system according to a fifth aspect of the present invention includes the toll collection facility (20A, 20C) according to any one of the above-described aspects, and the onboard unit (10B, 10C) according to any one of the above-described aspects.

With this configuration, the number of communications between the wireless communication device of the toll collection facility and the charge processing device can be reduced, whereby the time required for the onboard unit to send and receive the charge processing data to and from the toll collection facility can be reduced. Thus, even more efficient charge processing can be achieved in the toll collection system as a whole.

In the toll collection system according to a sixth aspect of the present invention, the toll collection facility includes the wireless communication device including: an upstream side wireless communication device (220) provided on an upstream side on the lane; and a downstream side wireless communication device (230) provided more on a downstream side on the lane than the upstream side wireless communication device. The charge processing device includes a charge result checking unit (212c) configured to determine that the write processing on the communication target device has failed to be correctly performed, when the charge processing data related to write processing on the communication target device executed by the upstream side wireless communication device does not match the charge processing data related to read processing on the communication target device executed by the downstream side wireless communication device.

With this configuration, the charge result checking unit can recognize whether the write processing has been appropriately executed on the communication target device by the upstream side wireless communication device based on the charge processing data acquired from the communication target device via the downstream side wireless communication device even when the write processing for the charge processing data is executed after the communications with the upstream side wireless communication device have been terminated so that the communication time between the communication target device and the toll collection facility can be shortened.

Thus, the charge result checking unit can recognize that the charge processing data has failed to be correctly written to the card-type portable recording medium, even when a trouble such as the card-type portable recording medium being removed occurs after the communication target device has terminated the communications with the upstream side wireless communication device and before the write processing for the charge processing data is executed.

A toll collection method according to a seventh aspect of the present invention is a toll collection method for executing read processing and write processing, for charge processing data, on a communication target device installed in a vehicle traveling on a lane based on a predetermined processing procedure. The toll collection method includes generating and sending scenario information indicating at least a part of the processing procedure; recording the scenario information in an internal recording medium; and executing read processing and write processing, for the charge processing data, on the communication target device, based on the scenario information recorded in the internal recording medium.

A method for controlling an onboard unit (10B) according to an eighth aspect of the present invention is a method for controlling an onboard unit configured to wirelessly send and receive data via a wireless communication unit. The method includes reading, when a card-type portable recording medium is inserted, charge processing data recorded in the card-type portable recording medium and copying the charge processing data in an internal recording medium; reading and sending, when a read command for the charge processing data is received via the wireless communication unit, the charge processing data copied in the internal recording medium; writing, when a write command for "new charge processing data" is received via the wireless communication unit, the received "new charge processing data" to the internal recording medium; and updating, after the "new charge processing data" has been written to the internal recording medium, the charge processing data recorded in the card-type portable recording medium, based on the "new charge processing data" written to the internal recording medium.

A program according to a ninth aspect of the present invention is a program for causing a computer in an onboard unit (10B) to function as: a wireless communication unit configured to wirelessly send and receive data;

a copy processing unit configured to read, when a card-type portable recording medium is inserted, charge processing data recorded in the card-type portable recording medium and copy the charge processing data in an internal recording medium; a read processing unit configured to read and send, when a read command for the charge processing data is received via the wireless communication unit, the charge processing data copied in the internal recording medium; a write processing unit configured to write, when a write command for "new charge processing data" is received via the wireless communication unit, the received "new charge processing data" to the internal recording medium; and a card update unit configured to update, after the "new charge processing data" has been written to the internal recording medium, the charge processing data recorded in the card-type portable recording medium, based on the "new charge processing data" written to the internal recording medium.

Advantageous Effect of Invention

The above-described toll collection facility, onboard unit, toll collection system, toll collection method, and program enable charge processing to be efficiently executed.

DESCRIPTION OF EMBODIMENTS

First Embodiment

A toll collection system 1A according to a first embodiment is described below with reference to FIG. 1 to FIG. 13B.

(Overall Configuration of Toll Collection System)

Figure 1:
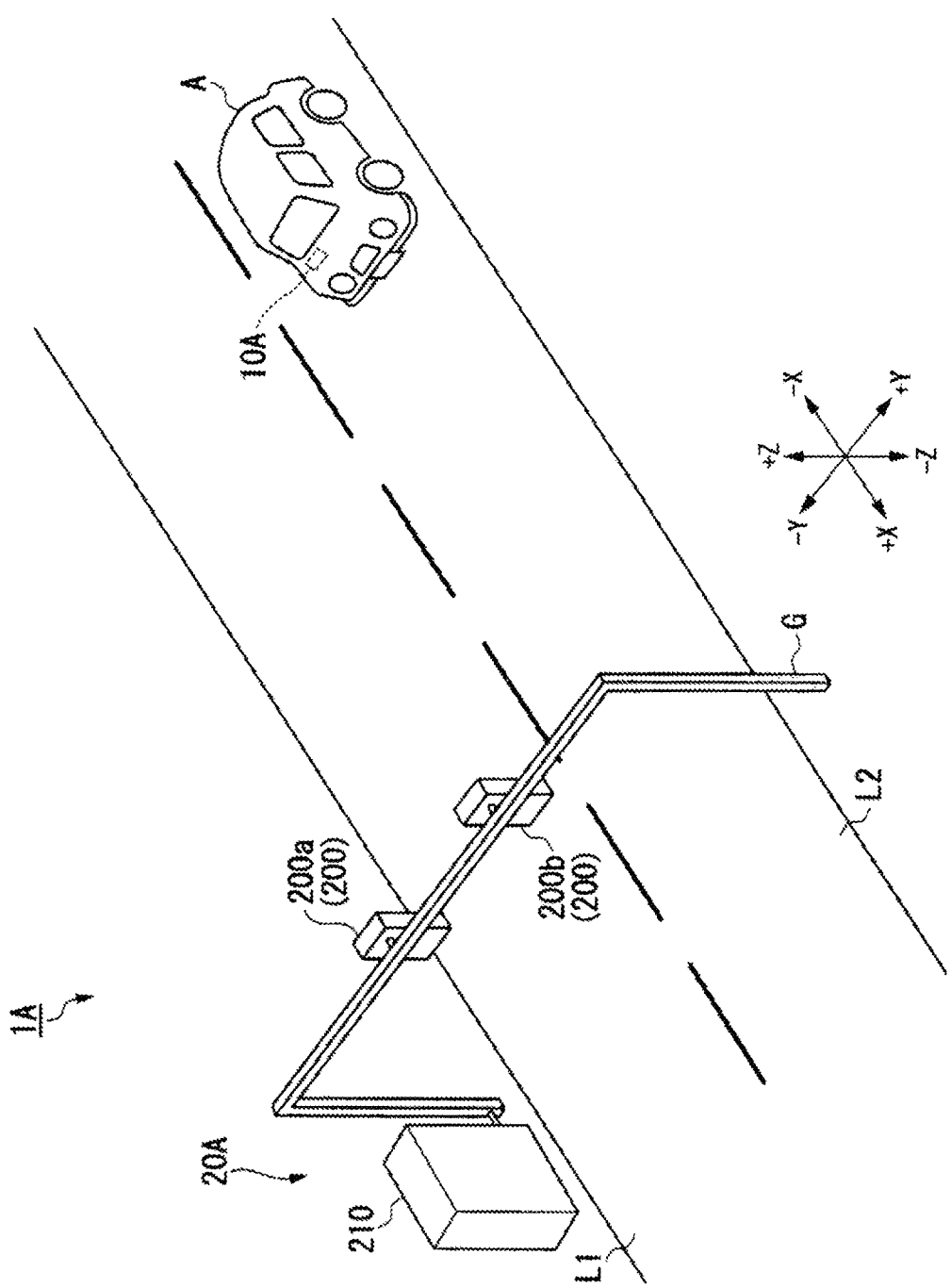
FIG. 1 is a diagram illustrating an overall configuration of a toll collection system according to a first embodiment of the present invention.

FIG. 1 is a diagram illustrating an overall configuration of a toll collection system according to a first embodiment of the present invention.

Figures 2, 3:
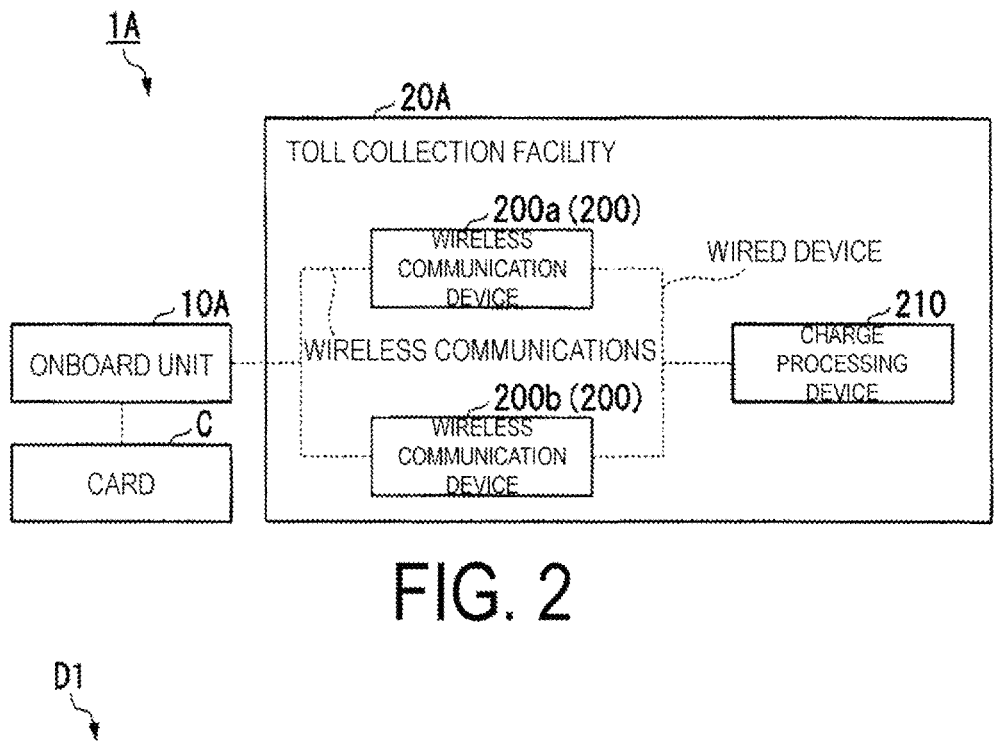
FIG. 2 is a diagram illustrating a functional configuration of the toll collection system according to the first embodiment of the present invention.
FIG. 3 is a diagram illustrating an example of charge processing data according to the first embodiment of the present invention.

FIG. 2 is a diagram illustrating a functional configuration of the toll collection system according to the first embodiment of the present invention.

FIG. 3 is a diagram illustrating an example of charge processing data according to the first embodiment of the present invention.

This toll collection system 1A according to the present embodiment is an electronic toll collection system installed on a main line (hereinafter, also referred to as a "main road") of a toll road including a plurality of lanes. In a described aspect of the present embodiment, the toll road includes two lanes L1 and L2. In the described aspect of the present embodiment, the toll collection system 1A is installed in an exit tollgate of the toll road.

As illustrated in FIG. 1 and FIG. 2, the toll collection system 1A includes an onboard unit (communication target device) 10A and a toll collection facility 20A.

In the toll collection system 1A according to the present embodiment, the onboard unit 10A, installed in a vehicle A traveling on the main road (the lanes L1 and L2), and the toll collection facility 20A, installed on a roadside of the main road (the lanes L1 and L2), send and receive information and commands to and from each other via wireless communications.

In the present embodiment, the information sent and received via the wireless communications includes "charge processing data D1" (FIG. 3) that is a group of a plurality of pieces of information used when the toll collection facility 20A executes toll road fee charge processing on the onboard unit 10A. The commands sent and received via the wireless communications include read processing and write processing for the "charge processing data D1" or the like.

Each piece of information in the "charge processing data D1" is recorded at a predetermined address in a storage area of a card C inserted in the onboard unit 10A. The onboard unit 10A reads the "charge processing data D1" recorded in the card C, sends the data to the toll collection facility 20A, and updates the "charge processing data D1" recorded in the card C based on a command and information received from the toll collection facility 20A.

The card C is a card-type portable recording medium such as a prepaid card or a credit card having a magnetic stripe or an integrated circuit (IC) to and from which various types of information can be written and read. In an example described in the present embodiment, a prepaid card is used as the card C.

As illustrated in FIG. 3, the "charge processing data D1" includes information such as "card number", "balance (yen)", "charge processing history", "entry information", and "charge history".

The "card number" is a unique number for identifying the card C. The "balance" is information indicating an amount of money deposited in the card C, and thus is payable with the card C. The "charge processing history" is information in which date and time, a location (such as an exit tollgate number enabling an exit tollgate to be identified), a change amount, and the like, related to charge processing executed on the card C, are recorded while being associated with each other. The "entry information" is information indicating a location (such as an entrance tollgate number enabling an entrance tollgate to be identified) where the onboard unit 10A has entered the toll road. The "charge history" is information indicating date and time and the amount of deposit to the card C as well as balance before/after depositing, and the like.

As illustrated in FIG. 1 and FIG. 2, the toll collection facility 20A includes wireless communication devices 200 and a charge processing device 210.

The wireless communication devices 200 are attached to a gantry G that extends in a lane width direction (±Y direction in FIG. 1) to be provided over the lanes L1 and L2, and are affixed above the lanes L1 and L2. The wireless communication devices 200 send and receive information and commands to and from the onboard unit 10 via wireless communications.

In an aspect described in the present embodiment, the toll collection facility 20A has the wireless communication devices 200 each provided for a single lane. Specifically, as illustrated in FIG. 1, wireless communications devices 200a and 200b are respectively installed for the lanes L1 and L2. The wireless communication device 200a performs wireless communications, via electromagnetic waves, with the onboard unit 10A installed in the vehicle A within a range of a predetermined communicable area defined on a road surface of the lane L1. The wireless communication device 200b performs wireless communications, via electromagnetic waves, with the onboard unit 10A installed in the vehicle A within a range of a predetermined communicable area defined on a road surface of the lane L2.

In the present embodiment, the wireless communication devices 200 (wireless communication devices 200a and 200b) employ Radio Frequency Identifier (RFID) communications to perform wireless communications with the onboard unit 10A.

The charge processing device 210 is installed on the roadside of the lanes L1 and L2, and in the vicinity of the gantry G. The charge processing device 210 is in wired connection with the wireless communication device 200, and sends and receives the "charge processing data D1" to and from the onboard unit 10A via the wireless communication device 200. The charge processing device 210 calculates a charge amount for the onboard unit 10A, based on the "charge processing data D1" acquired from the onboard unit 10A, and executes the charge processing.

(Functional Configuration of Toll Collection Facility)

Next, a functional configuration of the toll collection facility 20A according to the present embodiment is described with reference to FIG. 4 and FIG. 5.

Figures 4, 5:
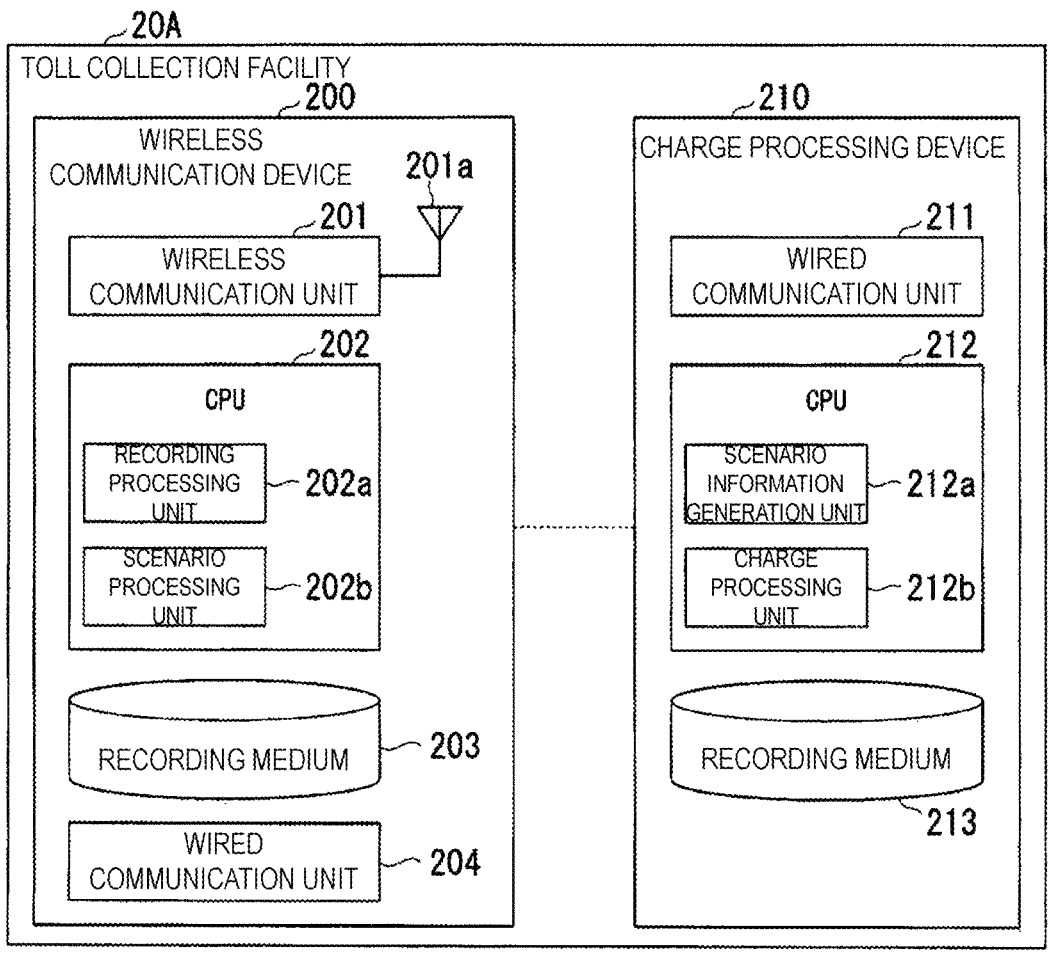
FIG. 4 is a diagram illustrating a functional configuration of a toll collection facility according to the first embodiment of the present invention.
FIG. 5 is a diagram illustrating an example of scenario information according to the first embodiment of the present invention.

FIG. 4 is a diagram illustrating a functional configuration of a toll collection facility according to the first embodiment of the present invention.

FIG. 5 is a diagram illustrating an example of scenario information according to the first embodiment of the present invention.

As illustrated in FIG. 4, the wireless communication device 200 of the toll collection facility 20A includes a wireless communication unit 201, a central processing unit (CPU), a recording medium (internal recording medium) 203, and a wired communication unit 204.

The wireless communication unit 201 includes an RFID antenna 201a. The wireless communication unit 201 outputs electromagnetic waves to a communicable area of the wireless communication device 200, via the RFID antenna 201a, at a predetermined time interval. The wireless communication unit 201 receives response waves, related to the electromagnetic waves, from the onboard unit 10A installed in the vehicle A that has entered the communicable area of the wireless communication device 200. Upon receiving the response waves, the wireless communication unit 201 outputs a "signal indicating establishment of communication with the onboard unit" to the CPU 202.

The electromagnetic waves and the response waves output and received by the wireless communication unit 201 include various types of information including the "charge processing data D1", commands, and the like. Thus, the wireless communication unit 201 sends and receives various information and commands, used for the charge processing, to and from the onboard unit 10A, via the electromagnetic waves and the response waves.

The CPU 202 includes a recording processing unit 202a and a scenario processing unit 202b.

The recording processing unit 202a records scenario information D2 (FIG. 5), received from the charge processing device 210, in the recording medium 203.

The scenario information D2 is information defining a series of processing procedures in advance. The series of processing procedures is at least a part of processing procedures (send command, send/receive data, and the like) required for the wireless communication device 200 to execute the charge processing on the onboard unit 10A. As illustrated in FIG. 5, the scenario information D2 is information in which a "trigger signal" set for each processing and a series of "processing procedures", executed when the "trigger signal" is received, are recorded while being associated with each other. The information is recorded for each processing.

When a signal (such as a signal indicating "establishment of communication with onboard unit" or "charge processing data write command" as illustrated in FIG. 5) is received, the scenario processing unit 202b selects and reads the scenario information D2 including a "trigger signal" matching the signal, from the scenario information D2 recorded in the recording medium 203. The scenario processing unit 202b executes various types of processing related to charge processing, based on "processing procedure" recoded in the scenario information D2 thus read.

The scenario information D2 and the "charge processing data D1" are recorded in the recording medium 203.

The wired communication unit 204 sends and receives commands and the "charge processing data D1", related to the charge processing, to and from the charge processing device 210 in wired connection with the wired communication unit 204 via a cable such as an optical fiber.

As illustrated in FIG. 4, the charge processing device 210 of the toll collection facility 20A includes a wired communication unit 211, a CPU 212, and a recording medium (internal recording medium) 213.

The wired communication unit 211 sends and receives a command and data, related to the charge processing, to and from the wireless communication device 200 in connection with the wired communication unit 211 via a cable such as an optical fiber.

The CPU 212 includes a scenario information generation unit 212a and a charge processing unit 212b.

The scenario information generation unit 212a generates the scenario information D2 for the toll collection facility 20A, by selecting at least a part of a plurality of pieces of scenario information D2, recorded in the recording medium 213 in advance, based on a tollgate including the toll collection facility 20A, a route of the toll road, and the like. The scenario information generation unit 212a may generate (add) new scenario information D2 via an input device and the like (not illustrated) of the charge processing device 210, and may generate new scenario information D2 by partially changing or deleting the recorded scenario information D2.

The scenario information generation unit 212a sends the scenario information D2 thus generated to the wireless communication device 200 via the wired communication unit 211.

The charge processing unit 212b calculates a charge amount for the onboard unit 10A, based on the "charge processing data D1" acquired from the onboard unit 10A via the wireless communication device 200. Specifically, the charge processing unit 212b calculates a charge amount for the onboard unit 10A, based on the "entry information" in the "charge processing data D1". The charge processing unit 212b generates "new charge processing data" including a "new charge processing history" and a "new balance". The "new charge processing history" includes a charge amount as well as the date and time and location at which the charge amount has been calculated. The "new balance" is obtained by subtracting the charge amount from the "balance" before the charge processing. The charge processing unit 212b sends a write command for the "new charge processing data" to the onboard unit 10A via the wireless communication device 200.

The scenario information D2 and the "charge processing data D1" are recorded in the recording medium 213.

(Processing Flow of Toll Collection Facility)

Next, a processing flow of the toll collection facility 20A according to the present embodiment is described with reference to FIG. 6 to FIG. 12.

Figure 6:
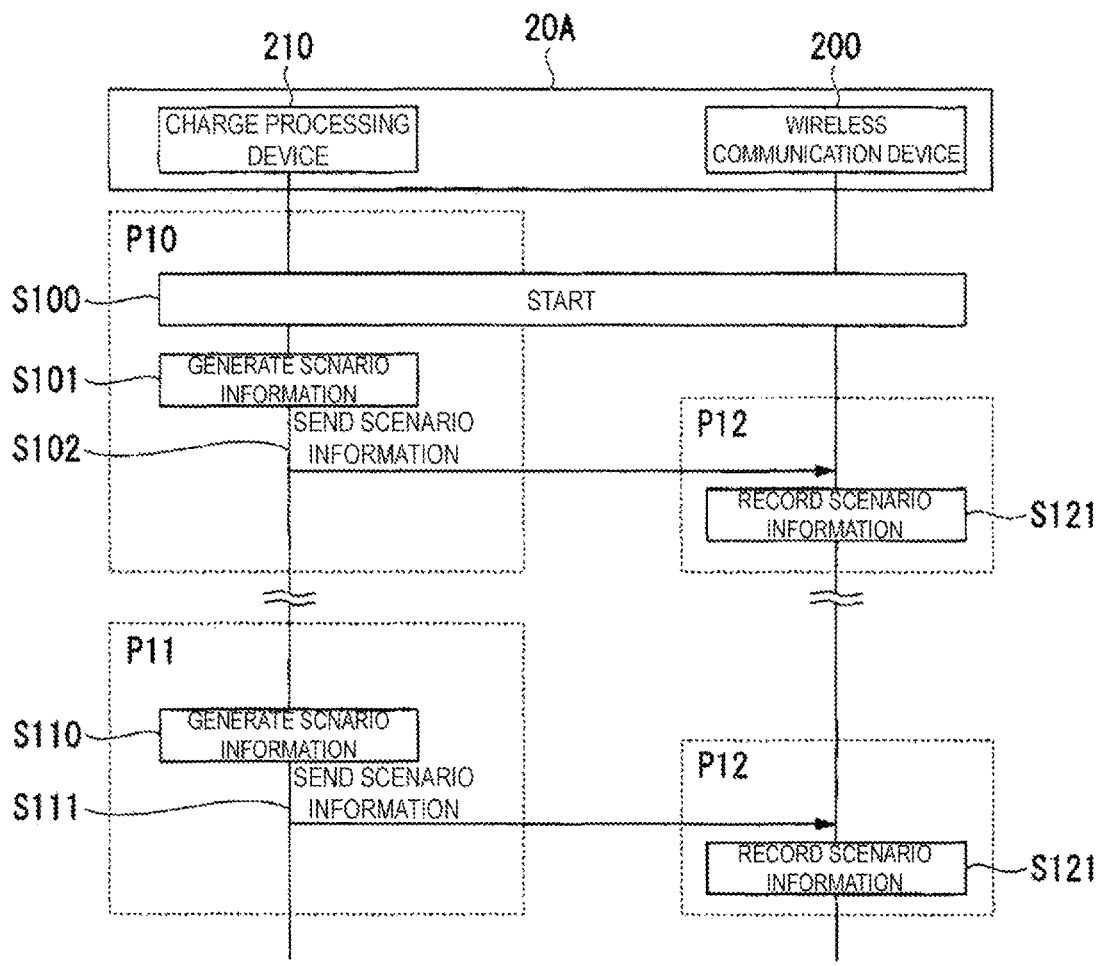
FIG. 6 is a first diagram explaining functions of the toll collection facility according to the first embodiment of the present invention.

FIG. 6 is a first diagram explaining functions of the toll collection facility according to the first embodiment of the present invention.

As illustrated in FIG. 6, when the toll collection facility 20A starts, the charge processing device 210 executes "processing P10 of sending scenario information" to the wireless communication device 200, and the wireless communication device 200 executes "processing P12 of recording scenario information".

When the scenario information D2 is changed in the charge processing device 210, the charge processing device 210 executes "processing P11 of updating scenario information" in the wireless communication device 200, and the wireless communication device 200 executes "processing P12 of recording scenario information".

Figure 7:
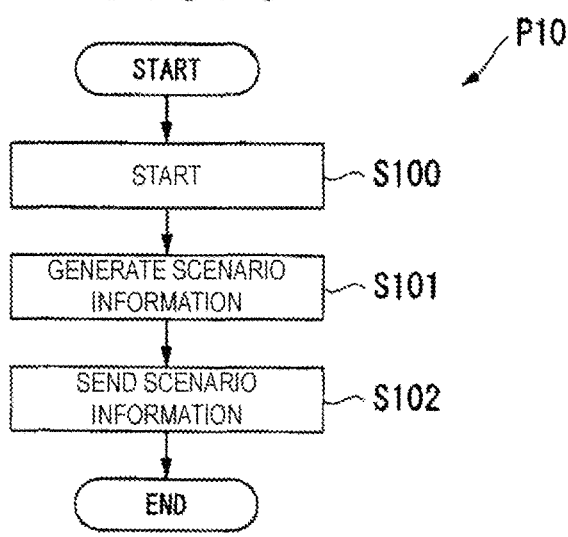
FIG. 7 is a first diagram illustrating a processing flow of a scenario information generation unit according to the first embodiment of the present invention.

FIG. 7 is a first diagram illustrating a processing flow of a scenario information generation unit according to the first embodiment of the present invention.

The "processing P10 of sending scenario information", executed by the charge processing device 210 when the facility starts, is described in detail below with reference to FIG. 7.

As illustrated in FIG. 7, the charge processing device 210 starts upon receiving a power supply and starting up operation (step S100).

Then, the scenario information generation unit 212a of the charge processing device 210 generates the scenario information D2 for the toll collection facility 20A by selecting at least a part of the plurality of pieces of scenario information D2 recorded in the recording medium 213 in advance, based on the tollgate including the toll collection facility 20A, a route of the toll road, and the like (step S101).

Then, the scenario information generation unit 212a sends the scenario information D2 thus generated to the wireless communication device 200 via the wired communication unit 211 (step S102), and terminates the "processing P10 of sending scenario information".

Figure 8:
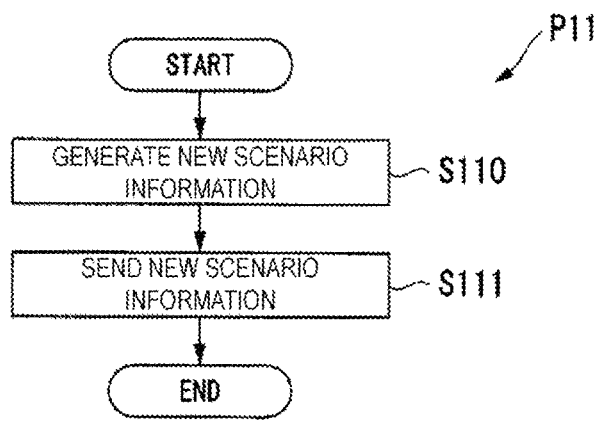
FIG. 8 is a second diagram illustrating a processing flow of the scenario information generation unit according to the first embodiment of the present invention.

FIG. 8 is a second diagram illustrating a processing flow of the scenario information generation unit according to the first embodiment of the present invention.

Next, the "processing P11 of updating scenario information" executed by the charge processing device 210 when the scenario information D2 is changed is described in detail with reference to FIG. 8.

As illustrated in FIG. 8, the scenario information generation unit 212a generates new scenario information by performing adding, changing, deleting, and the like of the scenario information D2, through the unillustrated input device and the like of the charge processing device 210 (step S110). The scenario information generation unit 212a updates the scenario information D2 recorded in the recording medium 213 by overwriting the scenario information D2 with the new scenario information or adding the new scenario information to the scenario information D2.

Next, the scenario information generation unit 212a sends the new scenario information to the wireless communication device 200 via the wired communication unit 211 (step S111), and terminates the "processing P11 of updating scenario information".

Figure 9:
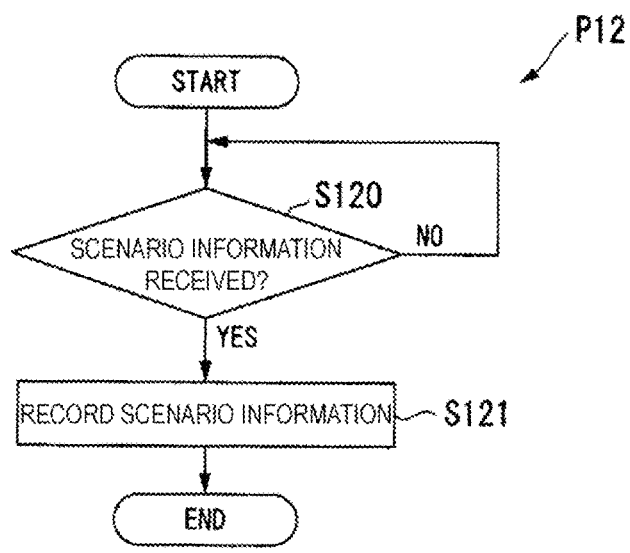
FIG. 9 is a diagram illustrating a processing flow of a recording processing unit according to the first embodiment of the present invention.

FIG. 9 is a diagram illustrating a processing flow of a recording processing unit according to the first embodiment of the present invention.

The "processing P12 of recording scenario information" executed by the wireless communication device 200 of the toll collection facility 20A is described below with reference to FIG. 9.

As illustrated in FIG. 9, first of all, the recording processing unit 202a of the wireless communication device 200 determines whether the scenario information D2 has been received from the charge processing device 210 (step S120).

When the scenario information D2 has not been received from the charge processing device 210 (step S120: NO), the recording processing unit 202a stands by until the scenario information D2 is received. On the other hand, when the scenario information D2 has been received from the charge processing device 210 (step S120: YES), the recording processing unit 202a proceeds to the next step S121.

Specifically, when the scenario information D2 has been received from the charge processing device 210 (step 120: YES), the recording processing unit 202a records the received scenario information D2 in the recording medium 203 of the wireless communication device 200 (step S121), and terminates the processing P12 of recording scenario information".

Figure 10:
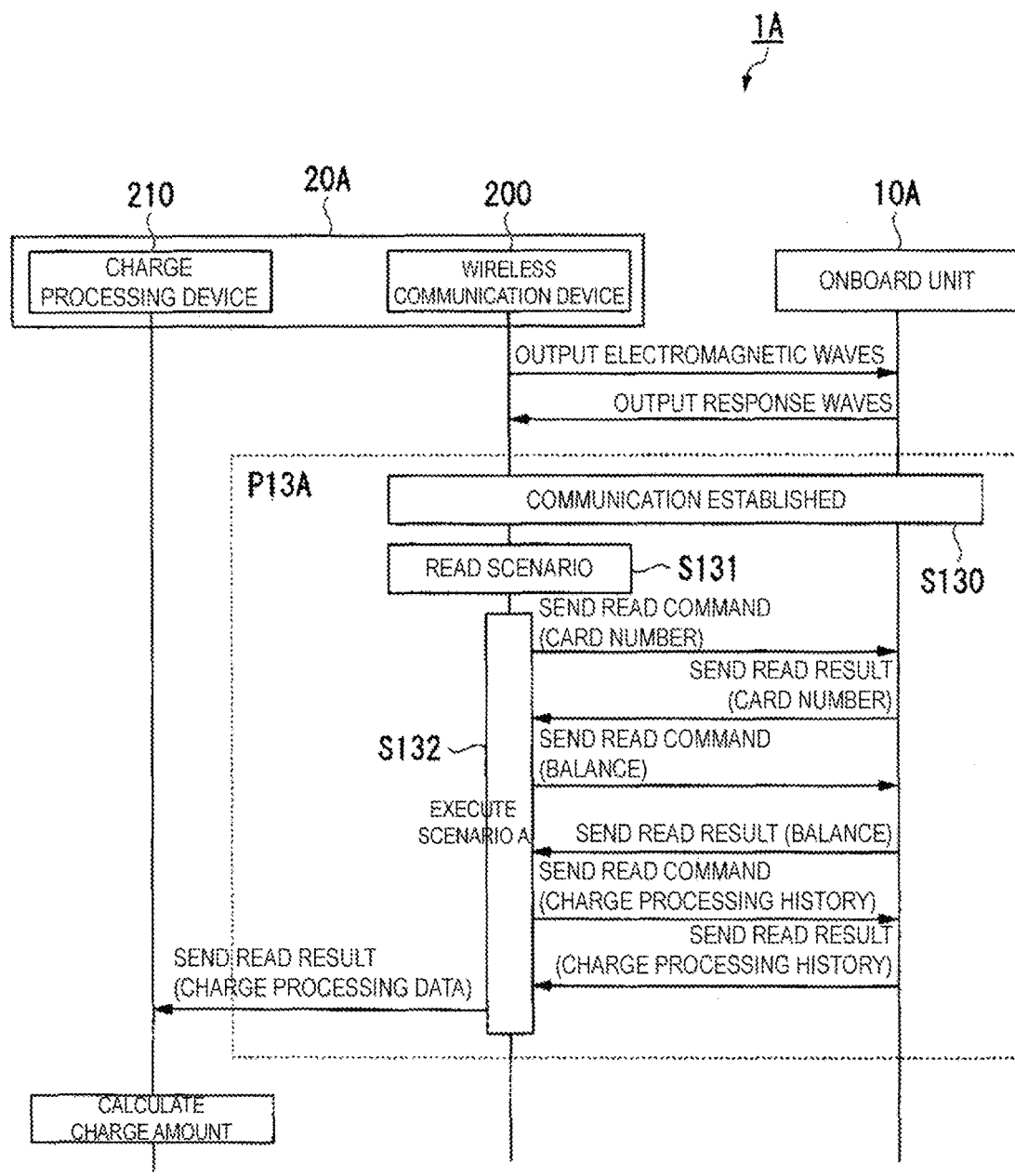
FIG. 10 is a second diagram explaining functions of the toll collection facility according to the first embodiment of the present invention.

FIG. 10 is a second diagram explaining functions of the toll collection facility according to the first embodiment of the present invention.

Figure 11:
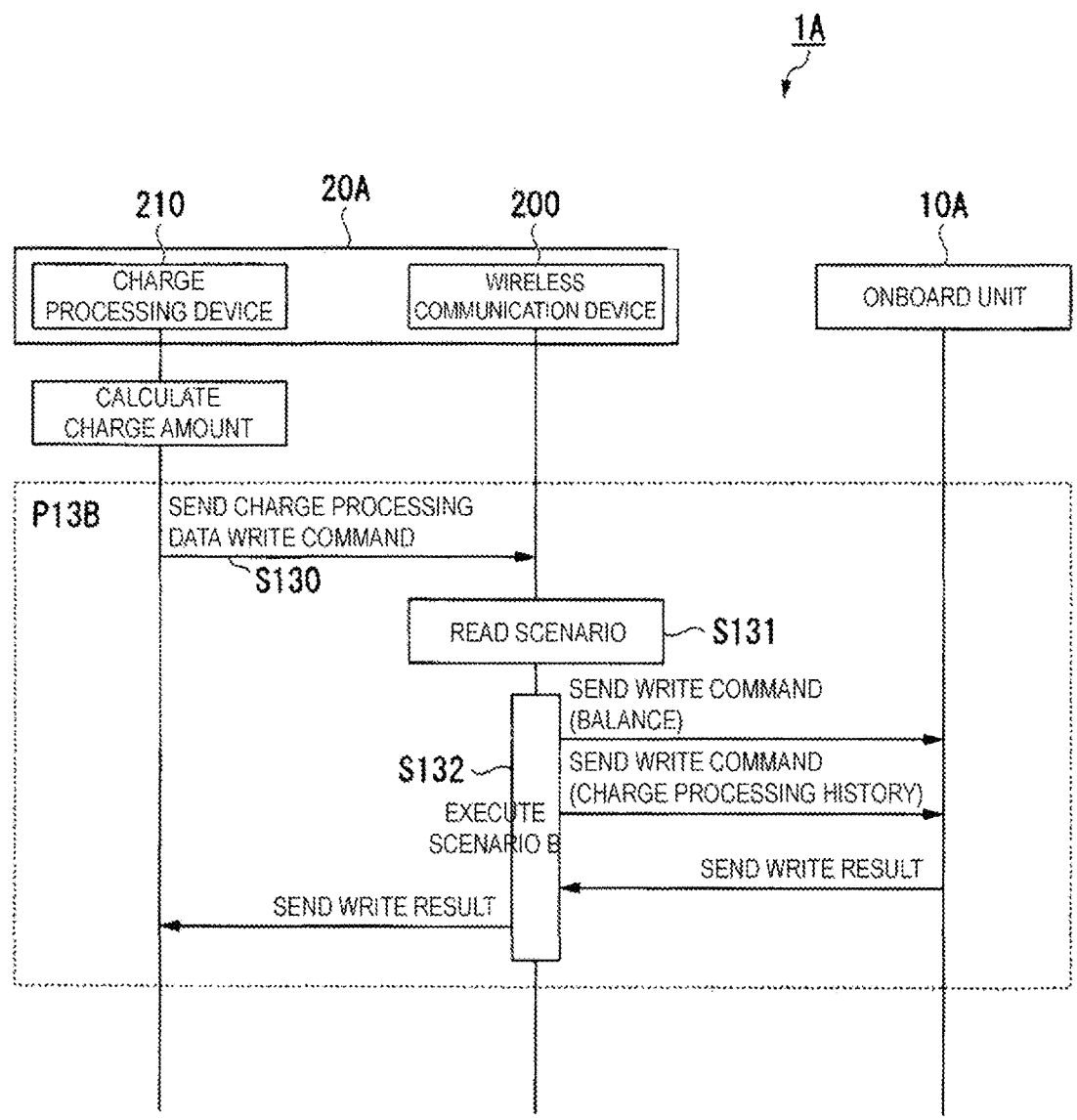
FIG. 11 is a third diagram explaining functions of the toll collection facility according to the first embodiment of the present invention.

FIG. 11 is a third diagram explaining functions of the toll collection facility according to the first embodiment of the present invention.

As illustrated in FIG. 10, the toll collection facility 20A executes "processing P13A of acquiring charge processing data" from the onboard unit 10A, when the vehicle A with the onboard unit 10A enters the communicable area of the wireless communication device 200.

As illustrated in FIG. 11, the toll collection facility 20A calculates a charge amount based on the "charge processing data D1" acquired from the onboard unit 10A, and then executes "processing P13B of writing charge processing data to onboard unit".

Figures 12, 13A, 13B:
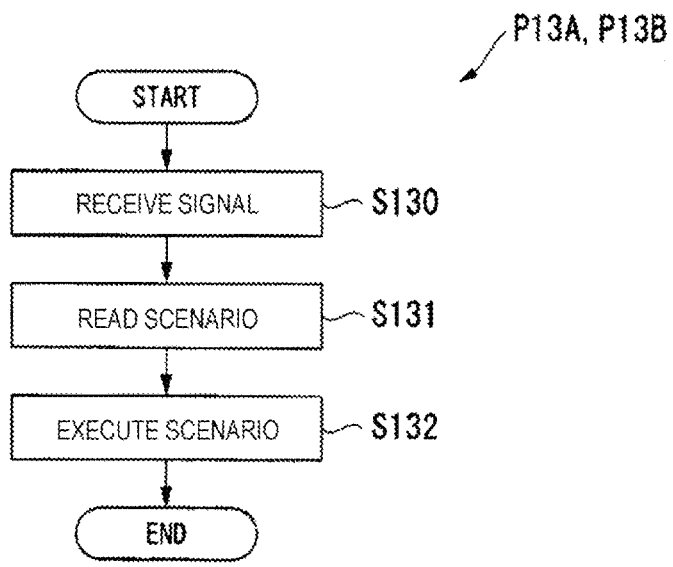
FIG. 12 is a diagram illustrating a processing flow of a scenario processing unit according to the first embodiment of the present invention.
FIG. 13A is a diagram illustrating an example of a conventional command according to the first embodiment of the present invention.
FIG. 13B is a diagram illustrating an example of an extended command according to the first embodiment of the present invention.

FIG. 12 is a diagram illustrating a processing flow of a scenario processing unit according to the first embodiment of the present invention.

FIG. 13A is a diagram illustrating an example of a conventional command according to the first embodiment of the present invention.

FIG. 13B is a diagram illustrating an example of an extended command according to the first embodiment of the present invention.

The "processing P13A of acquiring charge processing data" executed by the toll collection facility 20A is described below in detail with reference to FIGS. 10, 12, 13A, and 13B.

As illustrated in FIG. 12, first of all, the scenario processing unit 202b receives a "trigger signal" for executing the scenario information D2 (step S130).

In the example illustrated in FIG. 10, when the wireless communication unit 201 receives response waves from the onboard unit 10A so that communications with the onboard unit 10A are established, the wireless communication unit 201 outputs a signal indicating "establishment of communications with onboard unit" to the CPU 202. The scenario processing unit 202b of the CPU 202 receives the signal indicating "establishment of communications with onboard unit" serving as the "trigger signal" (step S130).

Next, as illustrated in FIG. 12, the scenario processing unit 202b selects and reads the scenario information D2 including the "trigger signal" matching the received signal, from the plurality of pieces of scenario information D2 recorded in the recording medium 203 (step S131).

In the example illustrated in FIG. 10, the scenario processing unit 202b selects and reads "scenario A" (FIG. 5) as the scenario information D2 including the "trigger signal" matching the signal indicating "establishment of communications with onboard unit" (step S131).

Next, as illustrated in FIG. 12, the scenario processing unit 202b executes a series of processing procedures based on the "processing procedure" recorded in the read scenario information D2 (step S132).

In the example illustrated in FIG. 10, the scenario processing unit 202b sends a command (READ command), for reading the "charge processing data D1", to the onboard unit 10A via the wireless communication unit 201, based on the "processing procedure" recorded in the read "scenario A" (FIG. 5).

Upon receiving a response (READ result), to the command, from the onboard unit 10A via the wireless communication unit 201, the scenario processing unit 202b sends the acquired "charge processing data D1" to the charge processing device 210 via the wired communication unit 204. Upon executing all the "processing procedures" recorded in the read scenario information D2, the scenario processing unit 202b terminates the "processing P13A of acquiring charge processing data".

Conventional toll collection facilities have used an eight byte command including a header (1 byte), data (6 bytes), and checksum (1 byte) as illustrated in FIG. 13A, as a command sent and received between the wireless communication device and the onboard unit.

The toll collection facility 20A according to the present embodiment uses a 64-byte extended command, including header (1 byte), data (62 bytes), and checksum (1 byte) as illustrated in FIG. 13B, as a command sent and received between the wireless communication device 200 and the onboard unit 10A.

For example, the "charge processing data D1" illustrated in FIG. 3 may include a large amount of information (larger than 6 bytes) such as the "charge processing history". In this case, when the wireless communication device 200 uses the conventional command to acquire the "charge processing history" from the onboard unit 10A, the "charge processing history" cannot be sent/received with a single command, and thus is divided to be in a plurality of commands to be sent/received. The communication time required for sending/receiving the "charge processing history" becomes longer as the number of commands sent/received between the wireless communication device 200 and the onboard unit 10A increases.

In view of this, the present embodiment uses the extended command enabling larger data to be sent and received compared with the conventional command. Thus, the number of commands used for sending and receiving a large amount of information such as the "charge processing history" can be reduced from that in the case where the conventional command is used. In this manner, the number of commands sent and received between the wireless communication device 200 and the onboard unit 10A can be reduced, whereby the communication time between the wireless communication device 200 and the onboard unit 10A can be reduced.

Next, the "processing P13B of writing charge processing data to onboard unit" executed by the toll collection facility 20A is described in detail with reference to FIG. 11 and FIG. 12.

As illustrated in FIG. 12, first of all, the scenario processing unit 202b receives a trigger for executing the scenario information D2 (step S130).

In the example illustrated in FIG. 11, the charge processing unit 212b of the charge processing device 210 calculates a charge amount for the onboard unit 10A, and then generates the "new charge processing data" based on the charge amount. The charge processing unit 212b sends the "new charge processing data" to the wireless communication device 200 together with a charge processing data write command.

Then, the scenario processing unit 202b of the CPU 202 receives a signal indicating the "charge processing data write command" sent from the charge processing device 210 (step S130).

Next, as illustrated in FIG. 12, the scenario processing unit 202b reads the scenario information D2 including the "trigger signal" matching the received signal, from the plurality of pieces of scenario information D2 recorded in the recording medium 203 (step S131).

In the example illustrated in FIG. 11, the scenario processing unit 202b selects and reads a "scenario B" (FIG. 5) as the scenario information D2 including the "trigger signal" matching the signal indicating "reception of charge processing data write command" (step S131).

Next, as illustrated in FIG. 12, the scenario processing unit 202b executes a series of processing procedures based on the "processing procedure" recorded in the read scenario information D2 (step S132).

In the example illustrated in FIG. 11, the scenario processing unit 202b sends a command (WRITE command) for writing the "charge processing data D1" to the onboard unit 10A via the wireless communication unit 201, based on the "processing procedure" recorded in the read "scenario B" (FIG. 5). Upon receiving a response (WRITE result), to the command, from the onboard unit 10A via the wireless communication unit 201, the scenario processing unit 202b sends the response (WRITE result) to the charge processing device 210 via the wired communication unit 204. Upon executing all the "processing procedures" recorded in the read scenario information D2, the scenario processing unit 202b terminates the "processing P13B of writing charge processing data to onboard unit".

Operational Effects

As described above, the toll collection facility 20A according to the present embodiment includes the wireless communication devices 200 provided to the lanes L1 and L2 and the charge processing device 210 configured to execute read processing and write processing, for the "charge processing data D1", on the onboard unit 10A installed in the vehicle A traveling on the lane via the wireless communication device 200, based on processing procedures defined in advance. The charge processing device (210) includes the scenario information generation unit 212a configured to generate and send scenario information indicating at least a part of the processing procedure. The wireless communication device 200 includes the recording processing unit 202a and the scenario processing unit 202b. The recording processing unit 202a records the scenario information D2, received from the charge processing device 210, in the recording medium 203. The scenario processing unit 202b executes the read processing and the write processing, for the "charge processing data D1", on the onboard unit 10A based on the scenario information D2 recorded in the recording medium 203.

With this configuration, the scenario processing unit 202b can autonomously determine and execute the processing to be executed on the onboard unit 10A without waiting for a command from the charge processing device 210. Thus, the number of communications between the charge processing device 210 and the wireless communication device 200 can be reduced, whereby efficient charge processing can be achieved.

The scenario information generation unit 212a generates and sends the scenario information D2, when the charge processing device 210 starts. With this configuration, after the charge processing device 210 has started, the scenario processing unit 202b of the wireless communication device 200 can autonomously determine and execute the processing to be executed on the onboard unit 10A without receiving the scenario information D2 from the charge processing device 210. Thus, the number of communications between the charge processing device 210 and the wireless communication device 200 can further be reduced.

The scenario information generation unit 212a generates the new scenario information D2 (by performing adding, changing, deleting, and the like) via the input device and the like (not illustrated) of the charge processing device 210. Then, the scenario information generation unit 212a sends the new scenario information D2 thus generated to the wireless communication device 200.

With this configuration, when the contents of communications, the "charge processing data D1" used for the charge processing, and the like change due to a change in the specification of the wireless communication device 200 or the like, the scenario information generation unit 212a generates the new scenario information D2 based on the change. Thus, various types of processing can be executed based on the changed contents of communications, data, and the like, without changing the device or software.

The wireless communication device 200 uses an extended command enabling larger data to be sent and received compared with a conventional command. With this configuration, the number of commands sent and received between the wireless communication device 200 and the onboard unit 10A is reduced, and the communication time can further be reduced.

In the described aspect of the present embodiment, the scenario information generation unit 212a generates the scenario information D2 and sends the scenario information D2 to the wireless communication device 200 each time the charge processing device 210 starts. However, this should not be construed in a limiting sense. In an alternative embodiment, the scenario information generation unit 212a may execute the "processing P10 of sending scenario information" only when the charge processing device 210 or the wireless communication device 200 starts for the first time, after the charge processing device 210 or the wireless communication device 200 has been newly installed, replaced, or the like. This configuration can also achieve effects similar to those described above.

Second Embodiment

Next, a toll collection system 1B according to a second embodiment of the present invention is described with reference to FIG. 14 to FIG. 21.

The same components as those in the first embodiment will be denoted by the same reference signs, and descriptions thereof will be omitted.

(Functional Configuration of Onboard Unit)

Figures 14, 15:
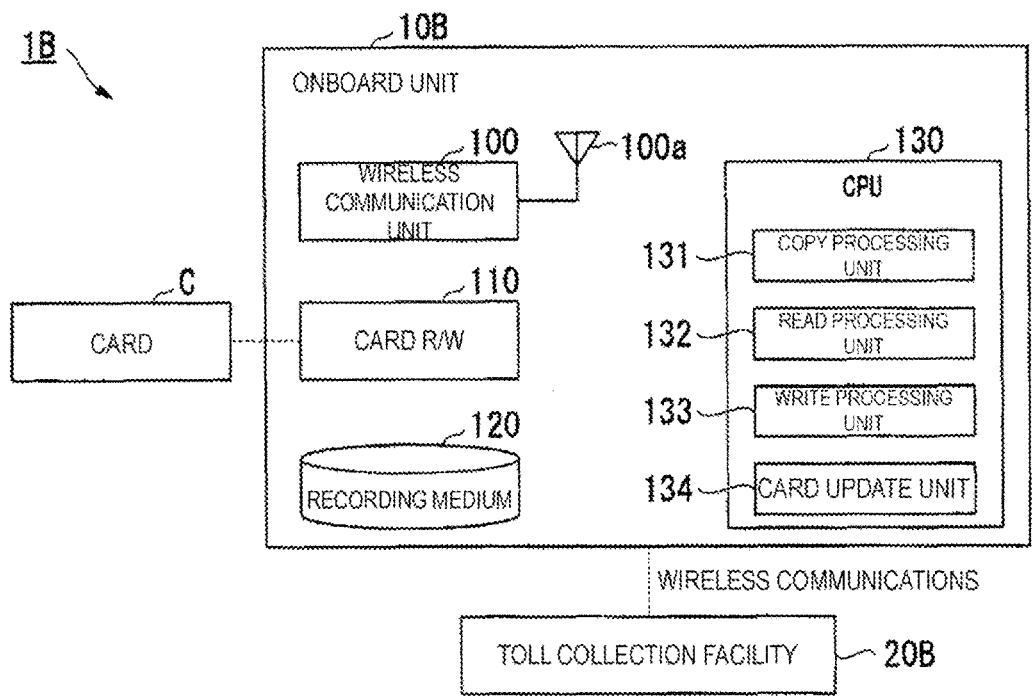
FIG. 14 is a diagram illustrating a functional configuration of an onboard unit according to a second embodiment of the present invention.
FIG. 15 is a diagram illustrating an example of charge processing data according to the second embodiment of the present invention.

FIG. 14 is a diagram illustrating a functional configuration of an onboard unit according to the second embodiment of the present invention.

As illustrated in FIG. 14, the toll collection system 1B according to the present embodiment includes an onboard unit 10B and a toll collection facility 20B instead of the onboard unit 10A and the toll collection facility 20A according to the first embodiment.

The toll collection facility 20B according to the present embodiment is a conventional toll collection facility. Thus, the toll collection facility 20B has a wireless communication device operating differently from that in the toll collection facility 20A according to the first embodiment. Specifically, the read and write processing for the "charge processing data D1" is executed between the wireless communication device and the onboard unit 10B based on a command from the charge processing device and without referring to the scenario information D2.

As illustrated in FIG. 14, an onboard unit 10B according to the present embodiment includes a wireless communication unit 100, a card reader/writer (R/W) 110, a recording medium (internal recording medium) 120, and a CPU 130.

The wireless communication unit 100 includes an RFID antenna 100a. The wireless communication unit 100 receives electromagnetic waves output from the toll collection facility 20B and returns respond waves, for the received electromagnetic waves, to the toll collection facility 20B, via the RFID antenna 100a.

The card R/W 110 executes the read processing and the write processing, for the "charge processing data D1" (FIG. 3), on the card C inserted to the onboard unit 10B.

Various types of information used for the charge processing, such as the "charge processing data D1", are recorded in the recording medium 120.

The CPU 130 executes processing of sending and receiving the "charge processing data D1" to and from the toll collection facility 20B via the wireless communication unit 100, and execute read and write processing for the "charge processing data D1" with the card C via the card R/W 110.

Specifically, as illustrated in FIG. 14, the CPU 130 includes a copy processing unit 131, a read processing unit 132, a write processing unit 133, and a card update unit 134.

When the card C is inserted in the onboard unit 10B, the copy processing unit 131 copies (records) the "charge processing data D1", read from the card C via the card R/W, in the recording medium 120. The copy processing unit 131 deletes the "charge processing data D1" recorded in the recoding medium 120, when the card C is removed from the onboard unit 10B.

Thus, the "charge processing data D1" illustrated in FIG. 3 is recorded in the recording medium 120 of the onboard unit 10B while the card C is inserted in the onboard unit 10B.

Upon receiving a read command for the "charge processing data D1" from the toll collection facility 20B via the wireless communication unit 100, the read processing unit 132 reads the "charge processing data D1" recorded in the recording medium 120. The read processing unit 132 sends the read "charge processing data D1" to the toll collection facility 20B via the wireless communication unit 100.

FIG. 15 is a diagram illustrating an example of charge processing data according to the second embodiment of the present invention.

Upon receiving a write command for the "new charge processing data" from the toll collection facility 20B via the wireless communication unit 100, the write processing unit 133 writes the "new charge processing data", received together with the write command, to the "charge processing data D1" recorded in the recording medium 120.

The "new charge processing data" according to the present embodiment includes a "new charge processing history" and a "new balance". The "new charge processing history" includes a charge amount as well as the date and time and location (such as an exit tollgate number enabling an exit tollgate including the toll collection facility 20B to be identified) at which the charge amount has been calculated. The "new balance" is obtained by subtracting the charge amount from the "balance" before the charge processing.

Upon receiving the write command for the "new charge processing data" as illustrated in FIG. 15, the write processing unit 133 additionally writes the "new charge processing history", in the "new charge processing data", to the "charge processing history" in the "charge processing data D1" recorded in the recording medium 120. The write processing unit 133 overwrites the "balance", in the "charge processing data D1" recorded in the recording medium 120, with the "new balance" in the "new charge processing data".

The card update unit 134 writes information (the "balance" and the "charge processing history" in the example illustrated in FIG. 15) written by the write processing unit 133, in the "charge processing data D1" recorded in the recording medium 120, to the card C via the card R/W 110. The card update unit 134 updates the "charge processing data D1" recorded in the card C so that the content of the "charge processing data D1" becomes the same as that of the "charge processing data D1" written to the recording medium 120.

In the aspect described in the present embodiment, the card update unit 134 performs updating by writing the information written by the write processing unit 133, in the "charge processing data D1" recorded in the recording medium 120, to the card C. However, this should not be construed in a limiting sense. In an alternative embodiment, the updating may be performed with the information in the "charge processing data D1", recorded in the recording medium 120, entirely written to the card C.

(Processing Flow of Onboard Unit)

Next, functions of the copy processing unit 131 of the onboard unit 10B will be described with reference to FIG. 16 and FIG. 17.

Figure 16:
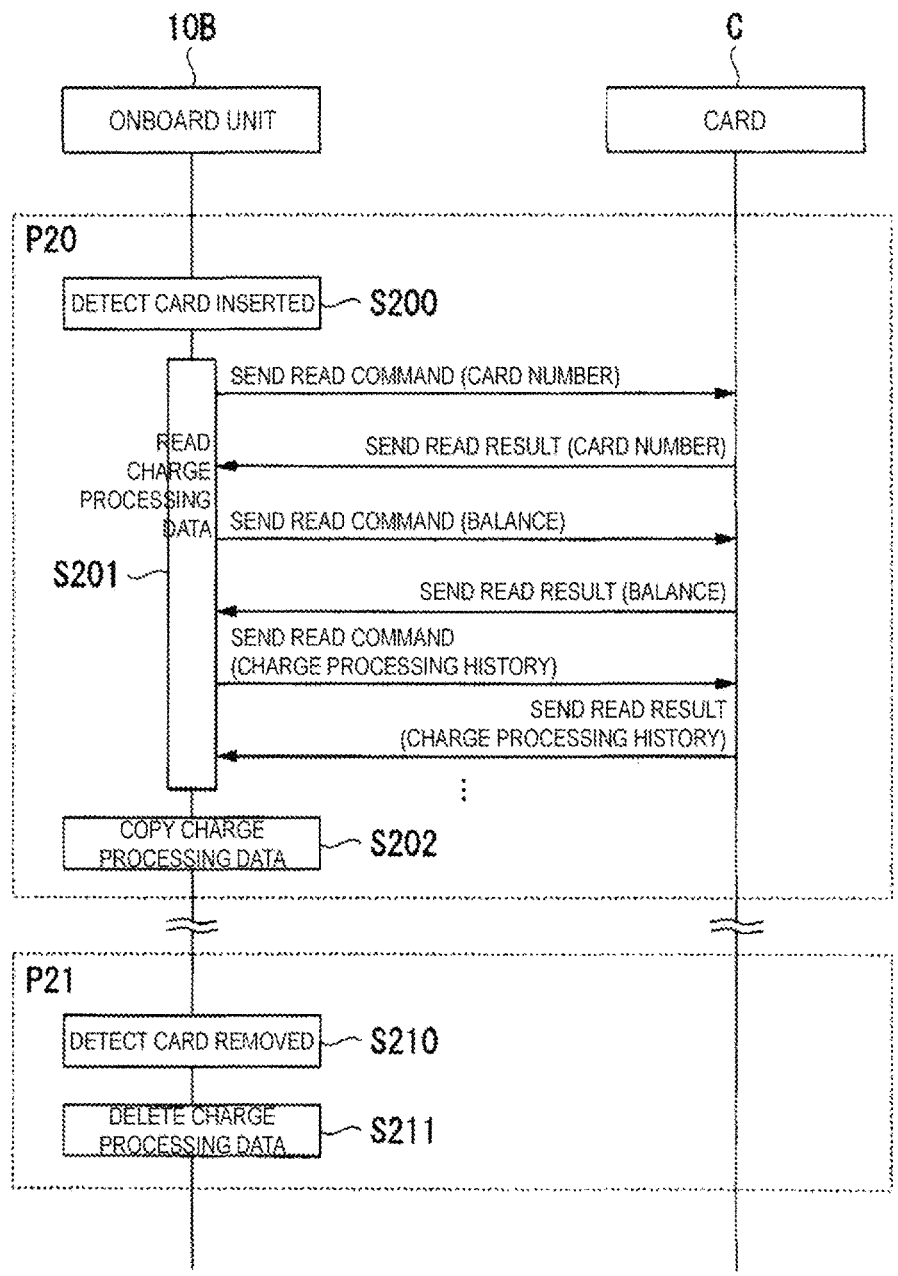
FIG. 16 is a diagram explaining functions of a copy processing unit in the onboard unit according to the second embodiment of the present invention.

FIG. 16 is a diagram explaining functions of a copy processing unit in the onboard unit according to the second embodiment of the present invention.

As illustrated in FIG. 16, upon detecting that the card C is inserted in the onboard unit 10B, the copy processing unit 131 of the CPU 130 executes "processing P20 of copying charge processing data".

Upon detecting that the card C has been removed from the onboard unit, the copy processing unit 131 executes "processing P21 of deleting charge processing data".

Figure 17:
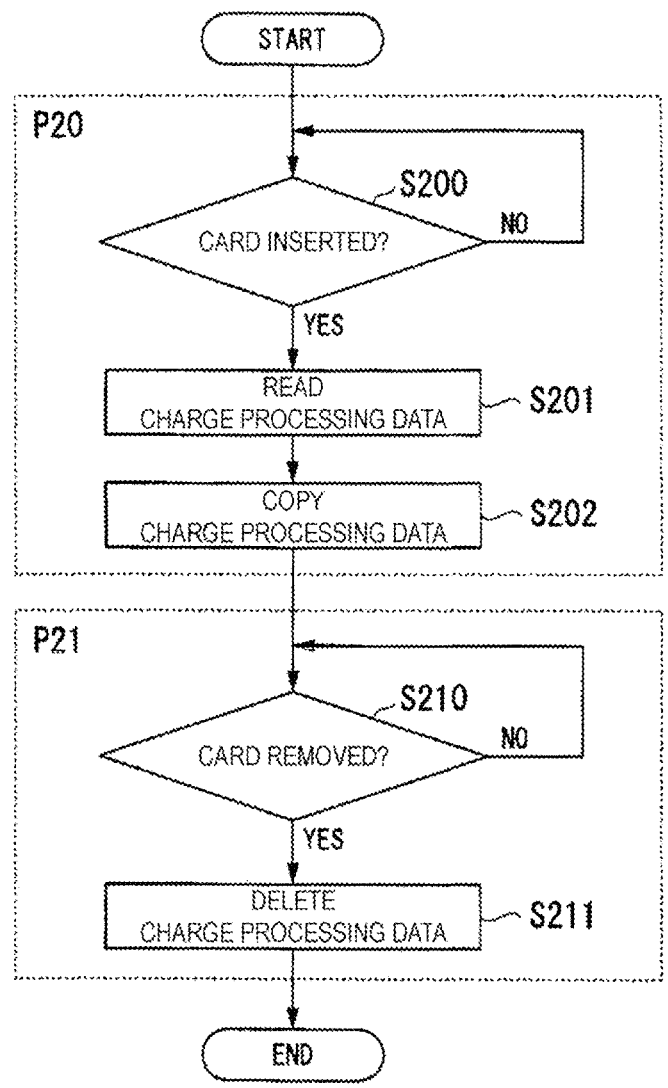
FIG. 17 is a diagram illustrating a processing flow of the copy processing unit in the onboard unit according to the second embodiment of the present invention.

FIG. 17 is a diagram illustrating a processing flow of the copy processing unit in the onboard unit according to the second embodiment of the present invention.

The "processing P20 of copying charge processing data" and the "processing P21 of deleting charge processing data", executed by the copy processing unit 131, are described below in detail with reference to FIG. 16 and FIG. 17.

As illustrated in FIG. 17, first of all, the copy processing unit 131 determines whether the card C is inserted in the onboard unit 10B (step S200).

When the card C is not inserted in the onboard unit 10B (step S200: NO), the copy processing unit 131 stands by until the card C is inserted in the onboard unit 10B. On the other hand, upon detecting that the card C is inserted in the onboard unit 10B (step S200: YES), the copy processing unit 131 proceeds to the next step S201.

Specifically, upon detecting that the card C is inserted in the onboard unit 10B (step S200: YES), the copy processing unit 131 reads the "charge processing data D1" from the card C via the card R/W 110 (step S201). In this process, as illustrated in FIG. 16, the copy processing unit 131 sends a command (READ command) for reading specific information (such as card number, balance, or charge processing history) from the card C, and receives a response (READ result), related to the command, from the card C. The copy processing unit 131 reads the "charge processing data D1" recorded in the card C by repeating the sending of the command and the reception of the response.

Next, as illustrated in FIG. 17, the copy processing unit 131 copies (records) the "charge processing data D1", read from the card C, in the recording medium 120 (step S202), and terminates the "processing P20 of copying charge processing data".

Upon terminating the "processing P20 of copying charge processing data", the copy processing unit 131 proceeds to the "processing P21 of deleting charge processing data".

After the "processing P21 of copying the charge processing data D1" to the recording medium 120" is terminated, the copy processing unit 131 determines whether the card C has been removed from the onboard unit 10B (step S210).

When the card C has not been removed from the onboard unit 10B (step S210: NO), the copy processing unit 131 stands by until the card C is removed from the onboard unit 10B. On the other hand, upon detecting that the card C has been removed from the onboard unit 10B (step S210: YES), the copy processing unit 131 proceeds to the next step S211.

Specifically, upon detecting that the card C has been removed from the onboard unit 10B (step S210: YES), the copy processing unit 131 deletes the "charge processing data D1" recorded in the recording medium 120 (step S211), and terminates the "processing P21 of deleting charge processing data".

Next, functions of the read processing unit 132 of the onboard unit 10B are described with reference to FIG. 18 to FIG. 19.

Figure 18:
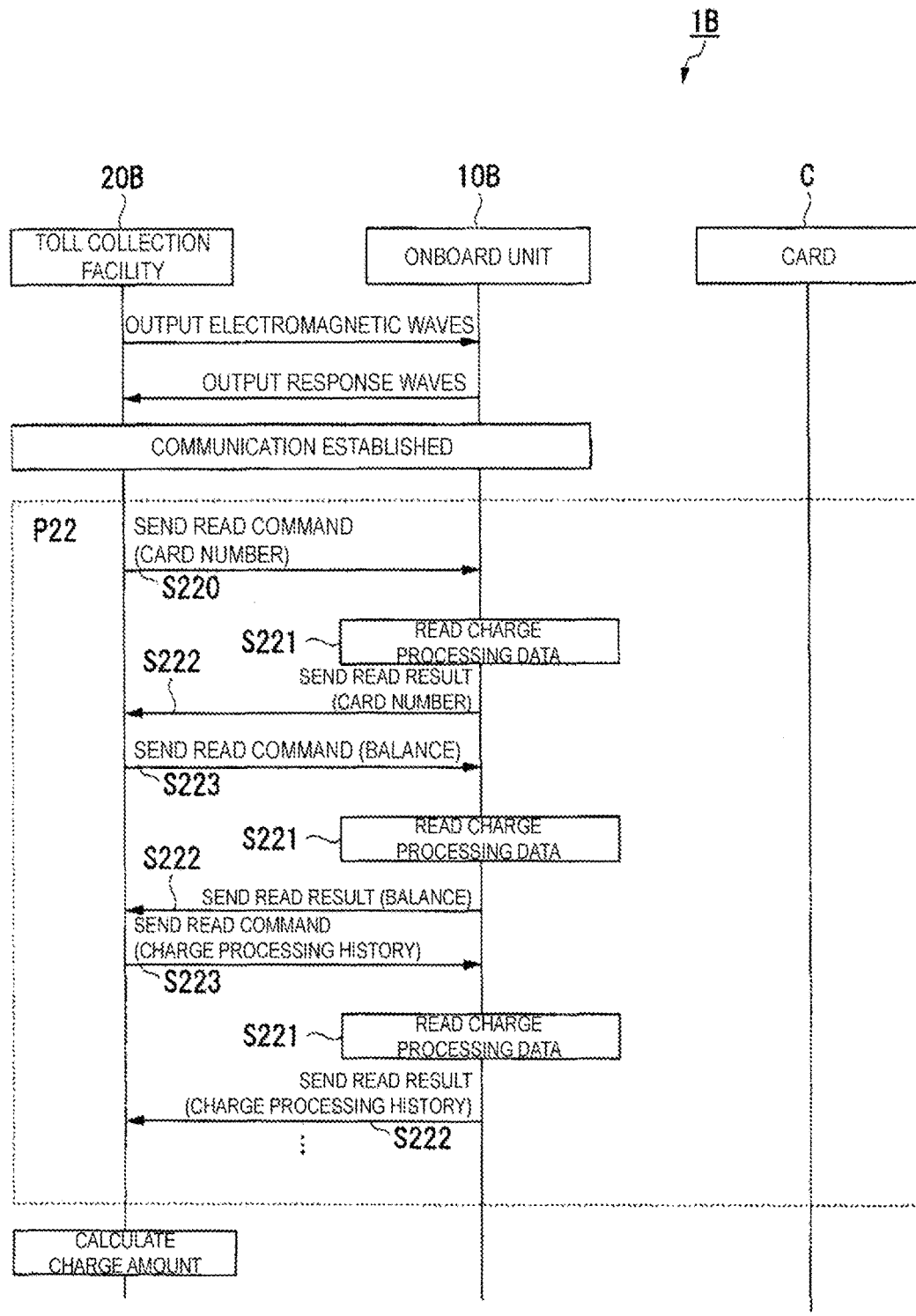
FIG. 18 is a diagram explaining functions of a read processing unit in the onboard unit according to the second embodiment of the present invention.

FIG. 18 is a diagram explaining functions of a read processing unit in the onboard unit according to the second embodiment of the present invention.

The toll collection facility 20B executes the charge processing on the vehicle A passing through the exit tollgate. Specifically, as illustrated in FIG. 18, the toll collection facility 20B outputs the electromagnetic waves to the communicable area, at a predetermined time interval. Upon receiving the electromagnetic waves output from the toll collection facility 20B, the wireless communication unit 100 of the onboard unit 10B returns the response waves related to the electromagnetic waves, to establish wireless communications with the toll collection facility 20B. The onboard unit 10B executes "read processing P22 for charge processing data" based on a read command (READ command) for the "charge processing data D1" received from the toll collection facility 20B.

Figure 19:
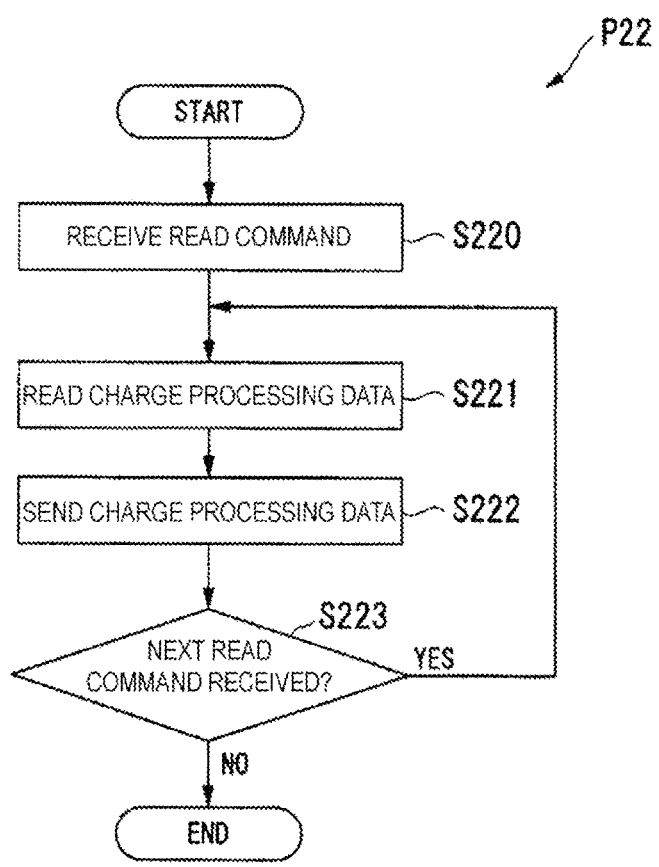
FIG. 19 is a diagram illustrating a processing flow of the read processing unit in the onboard unit according to the second embodiment of the present invention.

FIG. 19 is a diagram illustrating a processing flow of the read processing unit in the onboard unit according to the second embodiment of the present invention.

The "read processing P22 for charge processing data" executed by the read processing unit 132 is described in detail below with reference to FIG. 18 and FIG. 19.

As illustrated in FIG. 19, the read processing unit 132 reads the read command (READ command) for the "charge processing data D1" from the toll collection facility 20B via the wireless communication unit 100 (step S220).

Next, the read processing unit 132 reads the "charge processing data D1", recorded in the recording medium 120, based on the read command received from the toll collection facility 20B (step S221).

Next, as illustrated in FIG. 19, the read processing unit 132 sends the read "charge processing data D1" to the toll collection facility 20B via the wireless communication unit 100 (step S222).

Next, the read processing unit 132 determines whether the next read command is received from the toll collection facility 20B (step S223).

When the next read command is received from the toll collection facility 20B (step S223: YES), the read processing unit 132 repeats the processing in steps S221 and S222. On the other hand, when no next read command is received from the toll collection facility 20B (step S223: NO), the read processing unit 132 terminates the "read processing P22 for charge processing data".

In the example illustrated in FIG. 18, first of all, the read processing unit 132 receives a read command for the "card number" from the toll collection facility 20B (step S220).

The read processing unit 132 reads the "card number" from the "charge processing data D1" recorded in the recording medium 120, based on the read command (step S221). The read processing unit 132 sends the read "charge processing data D1" to the toll collection facility 20B (step S222).

Next, the read processing unit 132 receives the next command that is a read command for the "balance" (step S223: YES), and reads the "balance" from the "charge processing data D1" recorded in the recording medium 120, based on the read command (step S221). The read processing unit 132 sends the read "charge processing data D1" to the toll collection facility 20B (step S222).

In this manner, the read processing unit 132 repeats the processing in steps S221 and S222 until it is determined that no next command is received (step S223: NO) from the toll collection facility 20B.

Next, functions of the write processing unit 133 of the onboard unit 10B are described with reference to FIG. 20 and FIG. 21.

Figure 20:
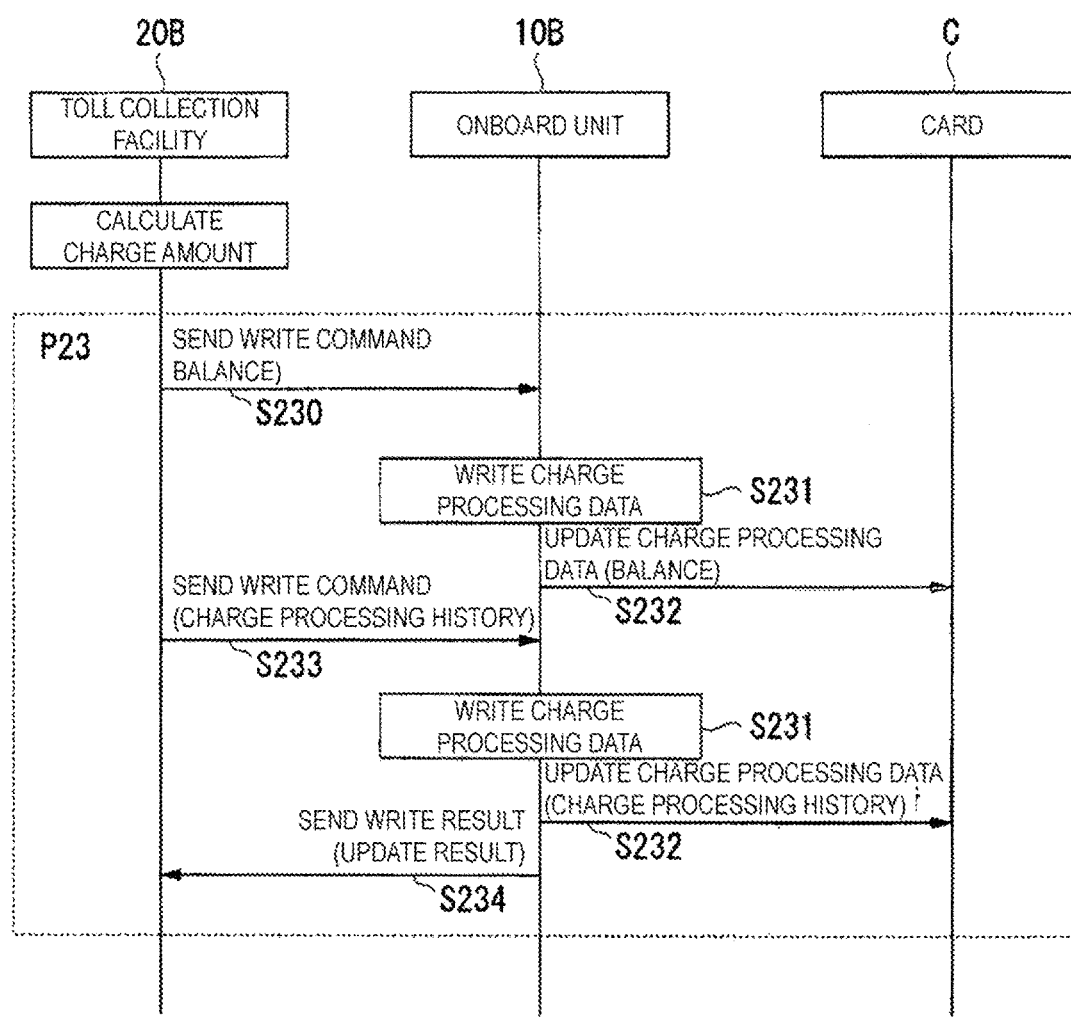
FIG. 20 is a diagram explaining functions of a write processing unit and a card update unit in the onboard unit according to the second embodiment of the present invention.

FIG. 20 is a diagram explaining functions of a write processing unit and a card update unit of the onboard unit according to the second embodiment of the present invention.

As illustrated in FIG. 20, the toll collection facility 20B calculates the charge amount based on the "charge processing data D1" acquired from the onboard unit 10B. Then, the toll collection facility 20B generates "new charge processing data" including "new balance" and "new charge processing history" based on the calculated charge amount, and sends a command (WRITE command) for writing the "new charge processing data" to the onboard unit 10B. The onboard unit 10B executes "processing P23 of updating new charge processing data" based on the command (WRITE command) received from the wireless communication device 200.

Figure 21:
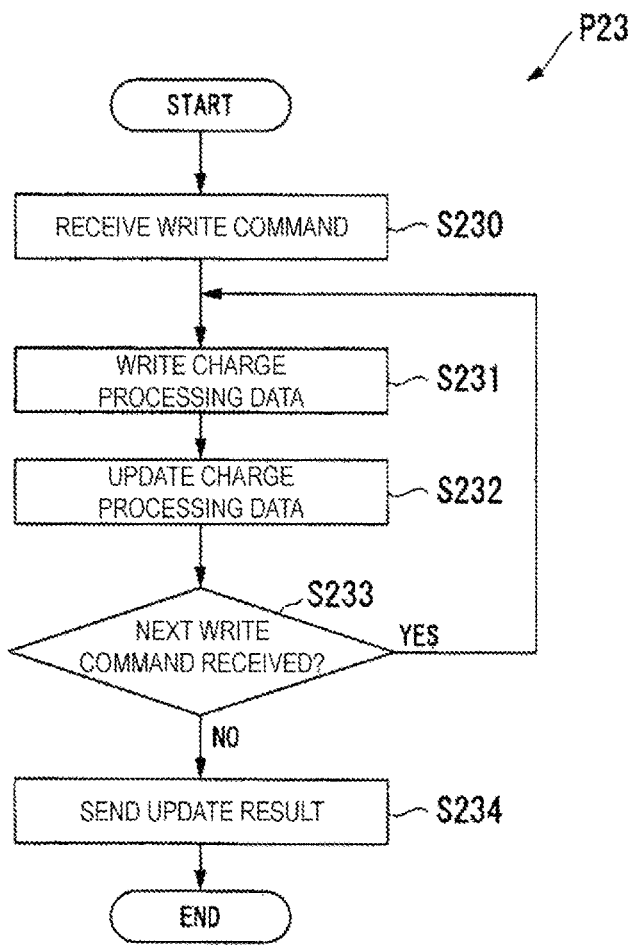
FIG. 21 is a diagram illustrating a processing flow of the write processing unit and the card update unit in the onboard unit according to the second embodiment of the present invention.

FIG. 21 is a diagram illustrating a processing flow of the write processing unit and the card update unit in the onboard unit according to the second embodiment of the present invention.

The "processing P23 of updating new charge processing data" executed by the write processing unit 133 and the card update unit 134 are described below in detail with reference to FIG. 20 and FIG. 21.

As illustrated in FIG. 21, the write processing unit 133 receives a write command (WRITE command) for the "charge processing data D1" from the toll collection facility 20B via the wireless communication unit 100 (step S230).

Next, the write processing unit 133 writes the "new charge processing data", received together with the write command from the toll collection facility 20B, to the "charge processing data D1" recorded in the recoding medium 120 (step S231).

In the example illustrated in FIG. 20, the write processing unit 133 receives a write command for the "new balance" as "new charge processing data" reflecting a result of the charge processing executed by the toll collection facility 20B (step S230). As illustrated in FIG. 15, the write processing unit 133 overwrites the "balance" in the "charge processing data D1" recorded in the recording medium 120 with the "new balance" in the "new charge processing data" (step S231).

Next, as illustrated in FIG. 21, the card update unit 134 performs updating by writing information, in the "charge processing data D1" recorded in the recording medium 120, written by the write processing unit 133, to the card C via the card R/W 110 (step S232).

In the example illustrated in FIG. 20, the card update unit 134 performs the updating by writing "balance" that is information written by the write processing unit 133, in the "charge processing data D1" recorded in the recording medium 120, to the card C (step S232).

Next, as illustrated in FIG. 21, the write processing unit 133 determines whether a next write command is received (step S233).

When the next write command is received from the toll collection facility 20B (step S233: YES), the write processing unit 133 repeats the processing in steps S231 and S232. On the other hand, when no next write command is received from the toll collection facility 20B (step S233: NO), the write processing unit 133 proceeds to the next step S234.

In the example illustrated in FIG. 20, the write processing unit 133 receives a write command for the "new charge processing history" as the next command (step S233: YES), and additionally writes the "new charge processing history" in the "new charge processing data" to the "charge processing history" in the "charge processing data D1" recorded in the recording medium 120 (step S231).

Next, the card update unit 134 performs updating by writing the "charge processing history" that is information written by the write processing unit 133, in the "charge processing data D1" recorded in the recording medium 120, to the card C (step S232).

Then, the write processing unit 133 determines that no next command is received from the toll collection facility 20B (step S233: NO), and proceeds to the next step S234.

Next, as illustrated in FIG. 21, the write processing unit 133 sends an update result, indicating that the "charge processing data D1" recorded in the card C has been updated, to the toll collection facility 20B (step S234). Then, the write processing unit 133 and the card update unit 134 terminate the "processing P23 of updating new charge processing data".

Operational Effects

As described above, the onboard unit 10B according to the present embodiment includes the wireless communication unit 100 configured to wirelessly send and receive data, the copy processing unit 131 configured to read the "charge processing data D1" recorded in the card C and copy the "charge processing data D1" to the recording medium 120 when the card C is inserted, the read processing unit 132 configured to read and send the "charge processing data D1" copied to the recording medium 120 upon receiving a read command for the "charge processing data D1" via the wireless communication unit 100, the write processing unit 133 configured to write, upon receiving "new charge processing data" and a write command for the "new charge processing data" via the wireless communication unit 100, the received "new charge processing data" to the recording medium 120, and the card update unit 134 configured to update, after the "new charge processing data" has been written to the recording medium 120, the "charge processing data D1 recorded in the card C based on the "new charge processing data" written to the recording medium 120.

With this configuration, the copy processing unit 131 copies the "charge processing data D1" recorded in the inserted card C. Thus, upon receiving the read command and the write command for the charge processing data D1, the read processing unit 132 executes the read and the write processing for the charge processing data D1 on the recording medium 120 featuring a higher access speed than the card C. Thus, the onboard unit 10B can send the charge processing data D1 with a shorter communication time compared with a configuration where the read and the write processing for the charge processing data D1 is executed on the card C each time a command is received. As a result, the toll collection facility 20B can achieve efficient charge processing.

The copy processing unit 131 deletes the "charge processing data D1" recorded in the recording medium 120, upon detecting that the card C has been removed from the onboard unit 10B.

Thus, when the card C is not inserted in the onboard unit 10B, erroneous charge processing can be prevented from being executed with the read processing unit 132 sending the "charge processing data D1" of the card C that is no longer inserted.

Modified Example of Second Embodiment

Next, a toll collection system 1C according to a modified example of the second embodiment of the present invention is described with reference to FIG. 22 and FIG. 23.

The same components as those in the embodiments described above will be denoted by the same reference signs, and descriptions thereof will be omitted.

In this modified example, an onboard unit 10C writes the "new charge processing data", received by the write processing unit 133 from the toll collection facility 20B, to the recording medium 120, and then terminates the communications with the collection facility 20B. After the communications with the toll collection facility 20B is terminated, the card update unit 134 performs updating by writing the "charge processing data D1" to the card C.

(Processing Flow of Onboard Unit)

Figure 22:
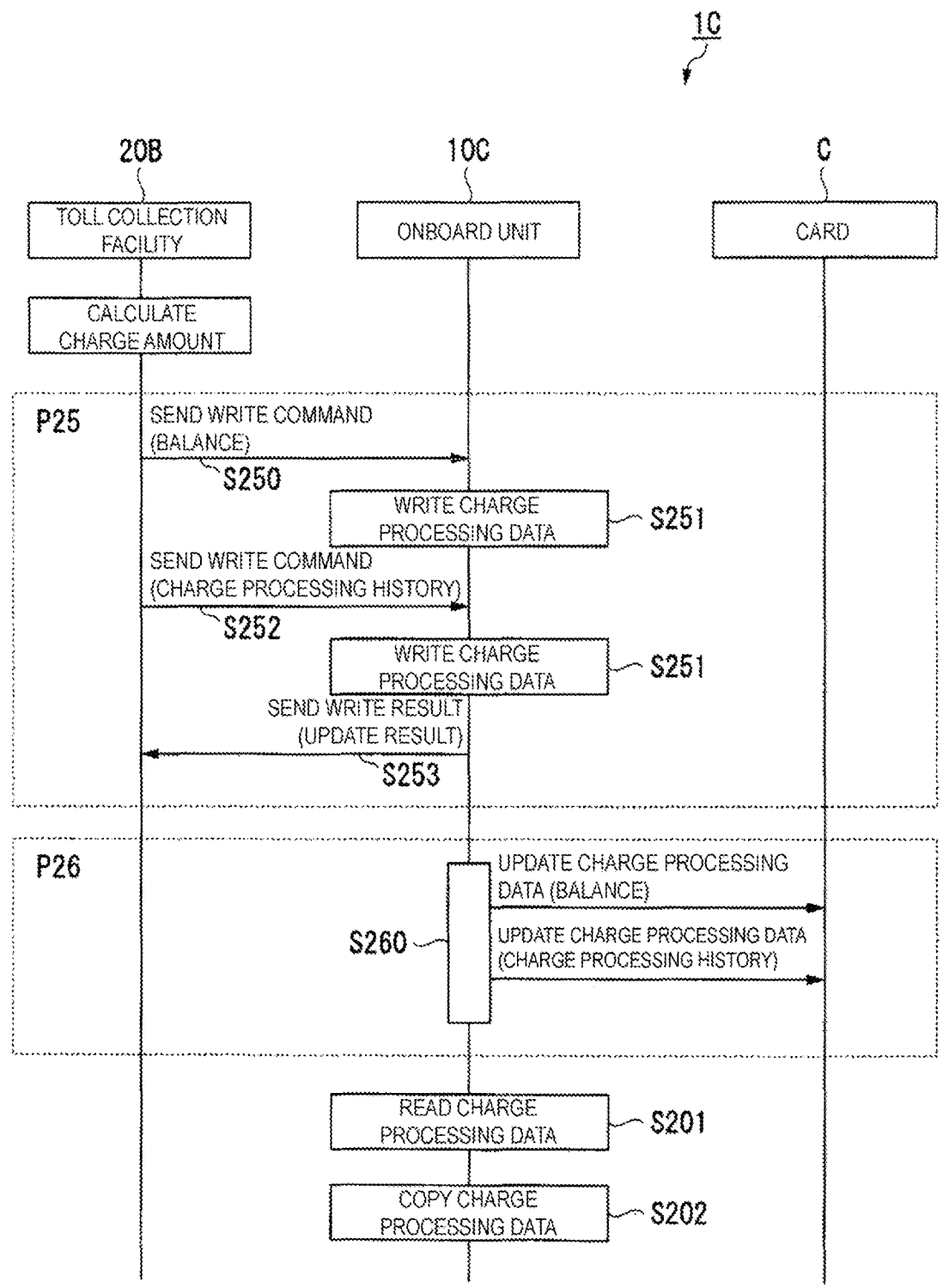
FIG. 22 is a diagram explaining functions of a write processing unit and a card update unit in the onboard unit according to a modified example of the second embodiment of the present invention.

FIG. 22 is a diagram explaining functions of a write processing unit and a card update unit of the onboard unit according to the modified example of the second embodiment of the present invention.

As illustrated in FIG. 22, the toll collection facility 20B sends a command (WRITE command) to the onboard unit 10C. This command is for writing the "new charge processing data", including the "new balance" and the "new charge processing history", as a result of charge amount calculation processing. The onboard unit 10C executes "processing P25 of writing "new charge processing data" and "processing P26 of updating charge processing data" based on the command (WRITE command) received from the wireless communication device 200.

Figure 23:
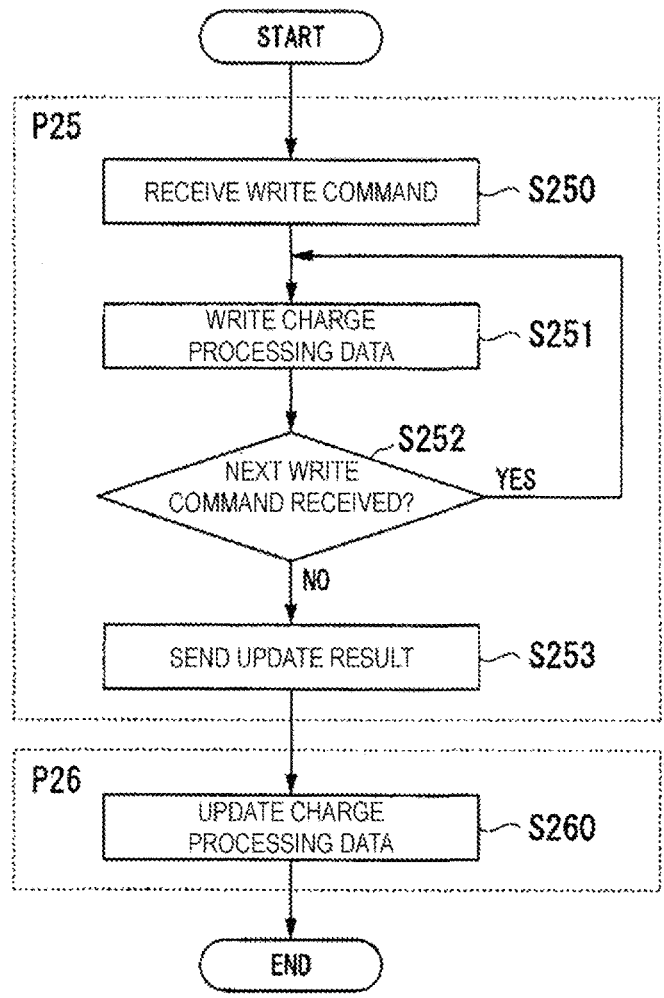
FIG. 23 is a diagram illustrating a processing flow of the write processing unit and the card update unit in the onboard unit according to the modified example of the second embodiment of the present invention.

FIG. 23 is a diagram illustrating a processing flow of the write processing unit and the card update unit of the onboard unit according to the modified example of the second embodiment of the present invention.

The "processing P25 of writing new charge processing data" executed by the write processing unit 133 and the "processing P26 of updating charge processing data" executed by the card update unit 134 are described in detail below with reference to FIG. 22 to FIG. 23.

As illustrated in FIG. 23, the write processing unit 133 starts the "processing P25 of writing new charge processing data" upon receiving a write command (WRITE command) for the "charge processing data D1" from the toll collection facility 20B via the wireless communication unit 100 (step S250).

Next, the write processing unit 133 writes the "new charge processing data", received together with the write command from the toll collection facility 20B, to the "charge processing data D1" recorded in the recoding medium 120 (step S251).

Next, the write processing unit 133 determines whether the next write command is received (step S252).

When the next write command is received from the toll collection facility 20B (step S252: YES), the write processing unit 133 repeats the processing in step S251. On the other hand, when no next write command is received from the toll collection facility 20B (step S252: NO), the write processing unit 133 proceeds to the next step S253.

In the example illustrated in FIG. 22, the write processing unit 133 receives a write command for the "new charge processing history" as the next command (step S252: YES), and additionally writes the "new charge processing history" in the "new charge processing data" to the "charge processing history" in the "charge processing data D1" recorded in the recording medium 120 (step S251).

Upon determining that no next command is received from the toll collection facility 20B (step S252: NO), the write processing unit 133 sends an update result indicating that the writing of the "new charge processing data" is completed to the toll collection facility 20B (step S253). The write processing unit 133 issues a notification indicating that the "charge processing data D1" recorded in the recording medium 120 has been updated to the card update unit 134. Then, the onboard unit 10C terminates the "processing P25 of writing new charge processing data", and terminates the communications with the toll collection facility 20B.

Next, the card update unit 134 starts the "processing P26 of updating charge processing data" in response to the notification from the write processing unit 133.

As illustrated in FIG. 23, the card update unit 134 performs updating by writing the information written by the write processing unit 133, in the "charge processing data D1" recorded in the recording medium 120, to the card C via the card R/W 110 (step S260).

In the example illustrated in FIG. 22, the "balance" and the "charge processing history" are information written by the write processing unit 133, in the "charge processing data D1" recorded in the recording medium 120. Thus, the updating is performed with the "balance" and the "charge processing history" written to the card C (step S260).

Upon updating the entire "charge processing data D1", the card update unit 134 terminates the "processing P26 of updating charge processing data".

The copy processing unit 131 may execute the "processing P20 of copying charge processing data" (FIG. 16 and FIG. 17) again, after the card update unit 134 has terminated the "processing P26 of updating charge processing data". This configuration ensures that the content of the "charge processing data D1" copied to the recording medium 120 of the onboard unit 10C matches the content of the "charge processing data D1" recorded in the card C.

Operational Effects

As described above, in the onboard unit 10C according to this modified example, the card update unit 134 updates the "charge processing data D1" recorded in the card C, after the wireless communication unit 100 has completed the reception of the new "charge processing data D1" and has terminated the communications with the toll collection facility 20B.

This configuration enables the wireless communication unit 100 to terminate the processing of receiving the "charge processing data D1" without waiting for completion of the updating of the "charge processing data D1" recorded in the card C. Thus, the communication time involved in the sending and reception of the "charge processing data D1" by the onboard unit 10C can further be reduced.

Third Embodiment

Next, a toll collection system 1D according to a third embodiment of the present invention is described with reference to FIG. 24 and FIG. 25.

The same components as those in the embodiments described above will be denoted by the same reference signs, and descriptions thereof will be omitted.

(Processing Flow of Toll Collection System)

Figure 24:
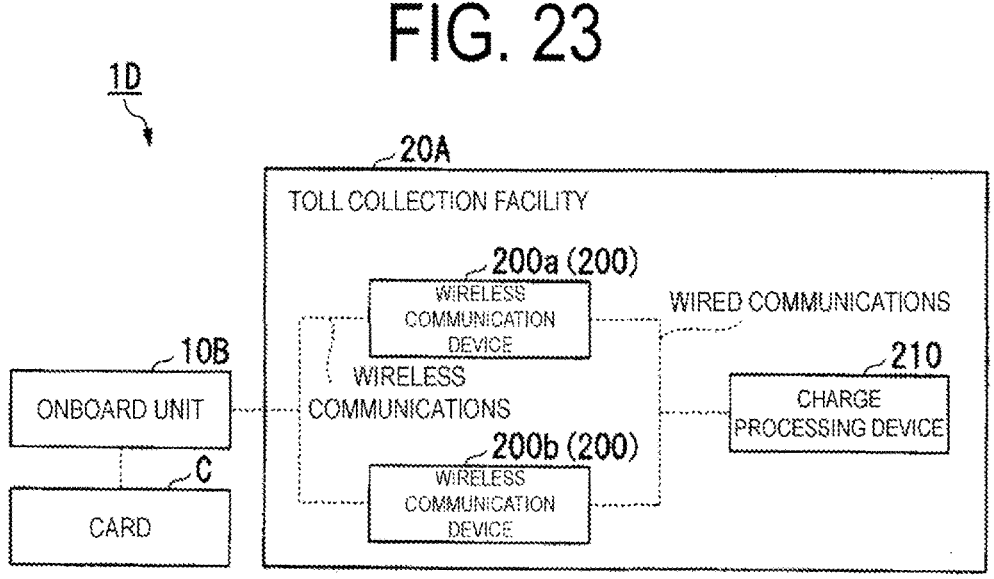
FIG. 24 is a diagram illustrating a functional configuration of a toll collection system according to a third embodiment of the present invention.

FIG. 24 is a diagram illustrating a functional configuration of a toll collection system according to the third embodiment of the present invention.

As illustrated in FIG. 24, the toll collection system 1D according to the present embodiment includes the toll collection facility 20A according to the first embodiment and the onboard unit 10B according to the second embodiment.

Figure 25:
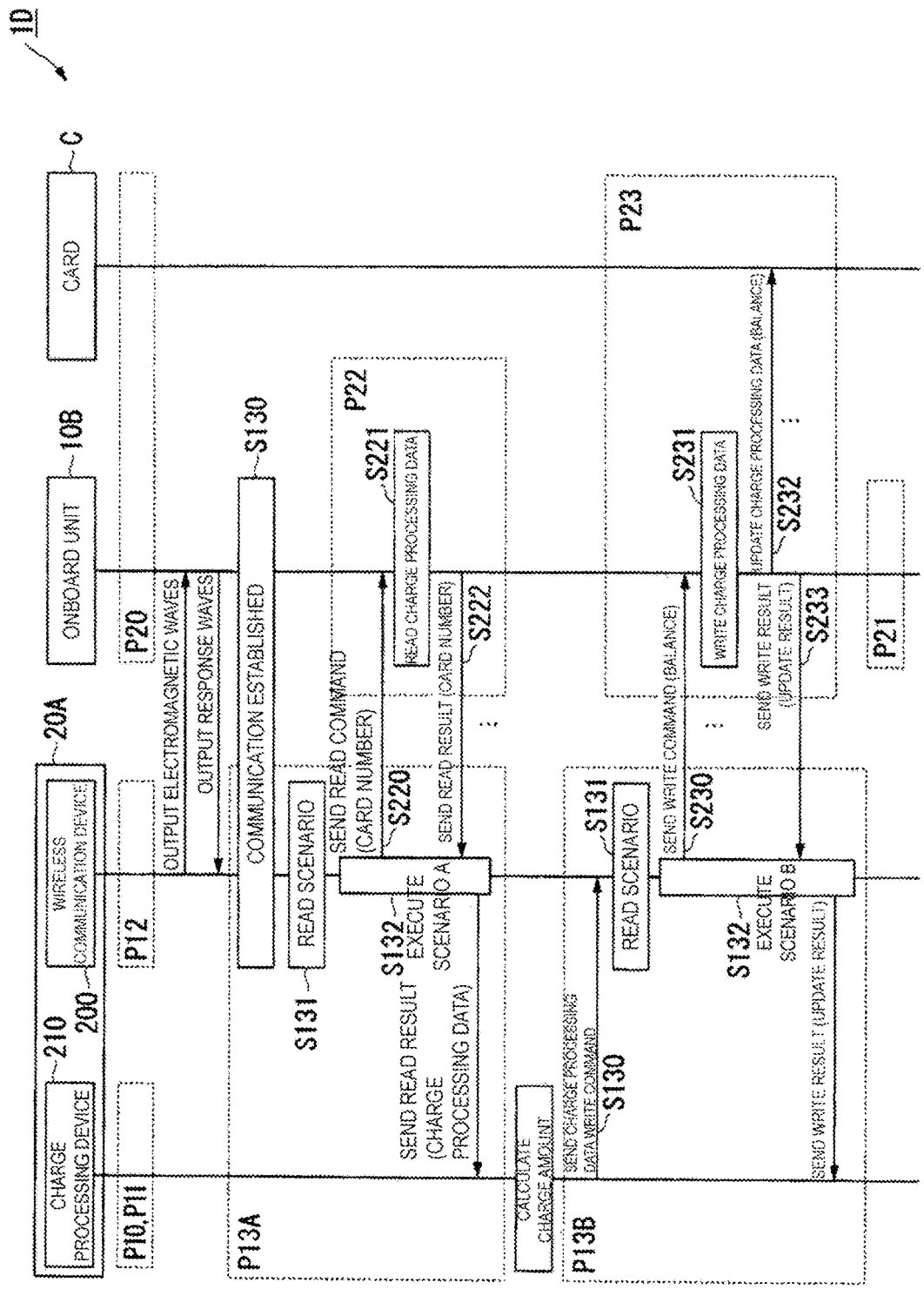
FIG. 25 is a diagram explaining functions of the toll collection system according to the third embodiment of the present invention.

FIG. 25 is a diagram explaining functions of the toll collection system according to the third embodiment of the present invention.

Each processing executed by the toll collection system 1D according to the present embodiment is described below with reference to FIG. 25.

As illustrated in FIG. 25, the toll collection facility 20A operates as in the first embodiment. Specifically, when the toll collection facility 20A starts, the charge processing device 210 executes the "processing P10 of sending scenario information" to the wireless communication device 200 (FIGS. 6 and 7), and the wireless communication device 200 executes the "processing P12 of recording scenario information" (FIGS. 6 and 9).

When the charge processing device 210 changes the scenario information D2, the charge processing device 210 executes the "processing P11 of updating scenario information" (FIGS. 6 and 8), and the wireless communication device 200 executes the "processing P12 of recording scenario information" (FIGS. 6 and 9).

As illustrated in FIG. 25, the onboard unit 10B operates as in the second embodiment. Specifically, upon detecting that the card C is inserted in the onboard unit 10B, the copy processing unit 131 executes the "processing P20 of copying charge processing data" (FIG. 16 and FIG. 17) acquired from the card C via the card R/W 110.

Upon detecting that the card C has been removed from the onboard unit, the copy processing unit 131 executes the "processing P21 of deleting charge processing data" (FIG. 16 and FIG. 17) recorded in the recording medium 120.

The toll collection facility 20A operates as in the first embodiment. Specifically, when the vehicle A with the onboard unit 10B enters the communicable area of the wireless communication device 200, the toll collection facility 20A executes the "processing P13A of acquiring charge processing data" from the onboard unit 10B (FIGS. 10 and 12). Specifically, upon receiving the "signal indicating establishment of communications with the onboard unit" (step S130), the scenario processing unit 202b of the wireless communication device 200 selects and reads the scenario information D2 including a "trigger signal" matching the received signal, from the plurality of pieces of scenario information D2 recorded in the recording medium 203 (step S131). Then, the scenario processing unit 202b executes a series of processing procedures based on the "processing procedure" recorded in the read scenario information D2 (scenario A) (step S132).

Upon receiving a read command (READ command) for the "charge processing data D1" from the wireless communication device 200 of the toll collection facility 20A, the onboard unit 10B executes the "read processing P22 for charge processing data" based on the read command (FIG. 18 to FIG. 19). Specifically, upon receiving a read command (READ command) for the "charge processing data D1" from the wireless communication device 200 (step S220, step S223: YES), the read processing unit 132 of the onboard unit 10B reads the "charge processing data D1" recorded in the recording medium 120 (step S221). Then, the read processing unit 132 sends the read "charge processing data D1" to the toll collection facility 20A via the wireless communication unit 100 (step S222).

Next, upon acquiring the "charge processing data D1" from the onboard unit 10B, the wireless communication device 200 of the toll collection facility 20A sends the "charge processing data D1" to the charge processing device 210. Upon executing all of a series of processing procedures in the scenario information D2 (scenario A), the scenario processing unit 202b terminates the "processing P13A of acquiring charge processing data".

Next, when the charge processing device 210 of the toll collection facility 20A calculates the charge amount and sends the "new charge processing data" to the wireless communication device 200, the scenario processing unit 202b of the wireless communication device 200 starts the "processing P13B of writing charge processing data to onboard unit" (FIG. 11 to FIG. 12). Specifically, upon receiving a signal indicating the "charge processing data write command" sent from the charge processing device 210 (step S130), the scenario processing unit 202b selects and reads the scenario information D2 (scenario B) including a "trigger signal" matching the received signal, from the plurality of pieces of scenario information D2 recorded in the recording medium 203 (step S131). Then, the scenario processing unit 202b executes a series of processing procedure (step S132) based on the "processing procedure" recorded in the read scenario information D2 (scenario B).

Upon receiving a write command (WRITE command) for the "charge processing data D1" from the wireless communication device 200 of the toll collection facility 20A, the onboard unit 10B executes the "processing P23 of updating new charge processing data" (FIG. 20 and FIG. 21) based on the write command. Specifically, upon receiving the write command (WRITE command) for the "charge processing data D1" from the wireless communication device 200 (step S230, step S233: YES), the write processing unit 133 of the onboard unit 10B writes the "new charge processing data", received from the wireless communication device 200 together with the write command, to the "charge processing data D1" recorded in the recording medium 120 (step S231). Next, the card update unit 134 of the onboard unit 10B writes information written by the write processing unit 133, in the "charge processing data D1" recorded in the recording medium 120, to the card C via the card R/W 110 (step S232). Upon determining that no next command is received from the toll collection facility 20A (step S233: NO), the write processing unit 133 returns an update result to the toll collection facility 20A (step S232), and terminates the "processing P23 of updating new charge processing data".

Next, upon acquiring the update result (WRITE result) from the onboard unit 10B, the wireless communication device 200 of the toll collection facility 20A sends the update result to the charge processing device 210. Upon executing all of a series of processing procedures in the scenario information D2 (scenario B), the scenario processing unit 202b terminates the "processing P13B of writing charge processing data to onboard unit".

In the example described in the present embodiment, the toll collection system 1D includes the onboard unit 10B according to the second embodiment, and executes the "processing P23 of updating new charge processing data" (FIG. 20 and FIG. 21). However, this should not be construed in a limiting sense. In an alternative embodiment, the toll collection system 1D may include the onboard unit 10C according to the modified example of the second embodiment, instead of the onboard unit 10B. In this case, the onboard unit 10C executes the "processing P25 of writing new charge processing data" and the "processing P26 of updating charge processing data" (FIG. 22 and FIG. 23), instead of the "processing P23 of updating new charge processing data".

Operational Effects

As described above, the toll collection system 1D according to the present embodiment includes the toll collection facility 20A according to the first embodiment and the onboard unit 10B according to the second embodiment.

With this configuration, the number of communications between the wireless communication device 200 of the toll collection facility 20A and the charge processing device 210 can be reduced, whereby the time required for the onboard unit 10B to send and receive the "charge processing data D1" to and from the toll collection facility 20A can be reduced. Thus, even more efficient charge processing can be achieved in the toll collection system 1D as a whole.

The toll collection system 1D may include the onboard unit 10C according to the modified example of the second embodiment instead of the onboard unit 10B.

With this configuration, the wireless communication unit 100 of the onboard unit 10C can terminate the processing of receiving the "charge processing data D1" without waiting for the completion of the updating of the "charge processing data D1" recorded in the card C. Thus, the communication time involved in the sending and reception of the "charge processing data D1" by the onboard unit 10C can further be reduced.

Fourth Embodiment

Next, a toll collection system 1R according to a fourth embodiment of the present invention is described with reference to FIG. 26 to FIG. 32.

The same components as those in the embodiments described above will be denoted by the same reference signs, and descriptions thereof will be omitted.

(Overall Configuration of Toll Collection System)

Figure 26:
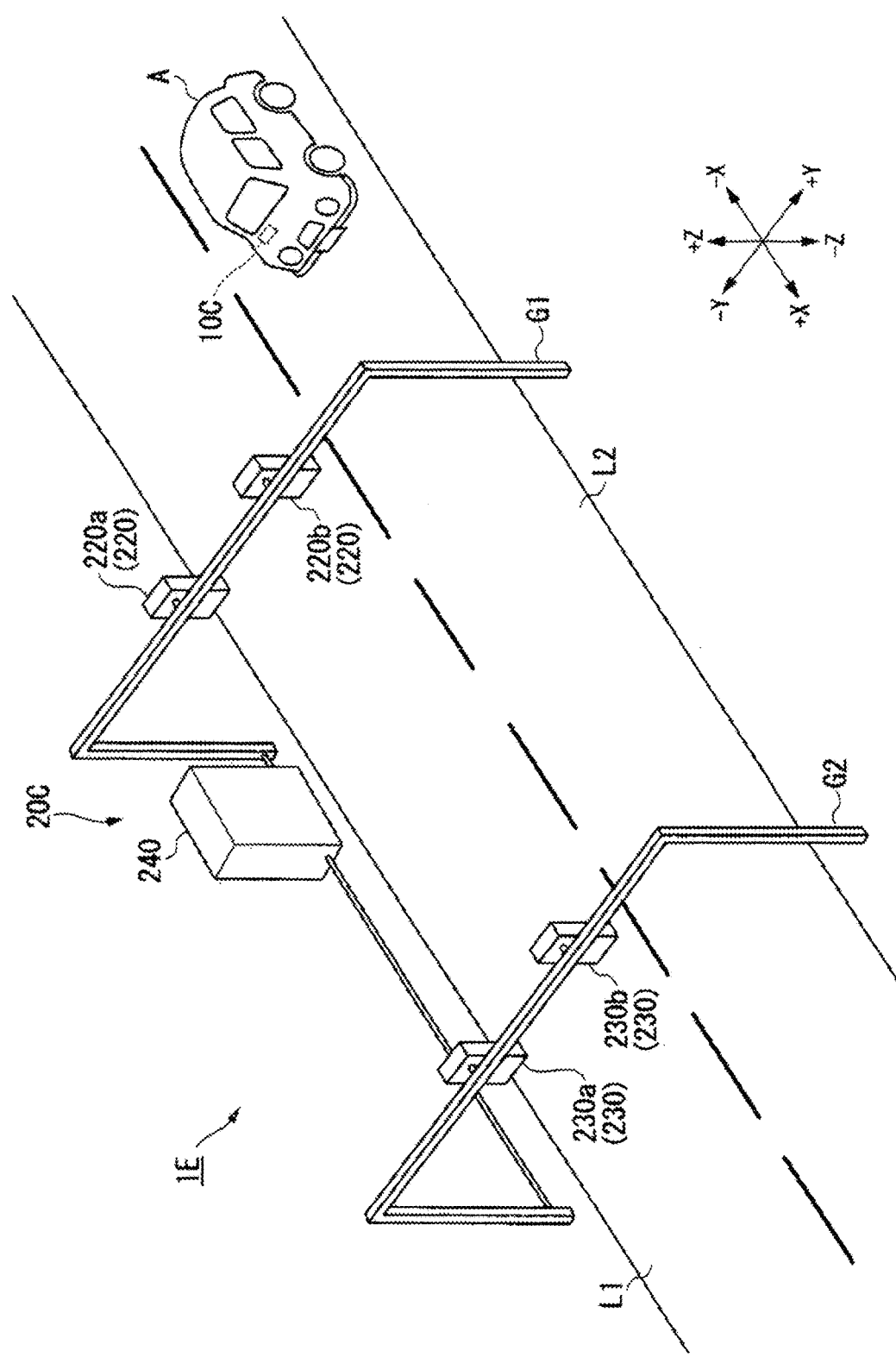
FIG. 26 is a diagram illustrating an overall configuration of a toll collection system according to a fourth embodiment of the present invention.

FIG. 26 is a diagram illustrating an overall configuration of the toll collection system according to the fourth embodiment of the present invention.

Figure 27:
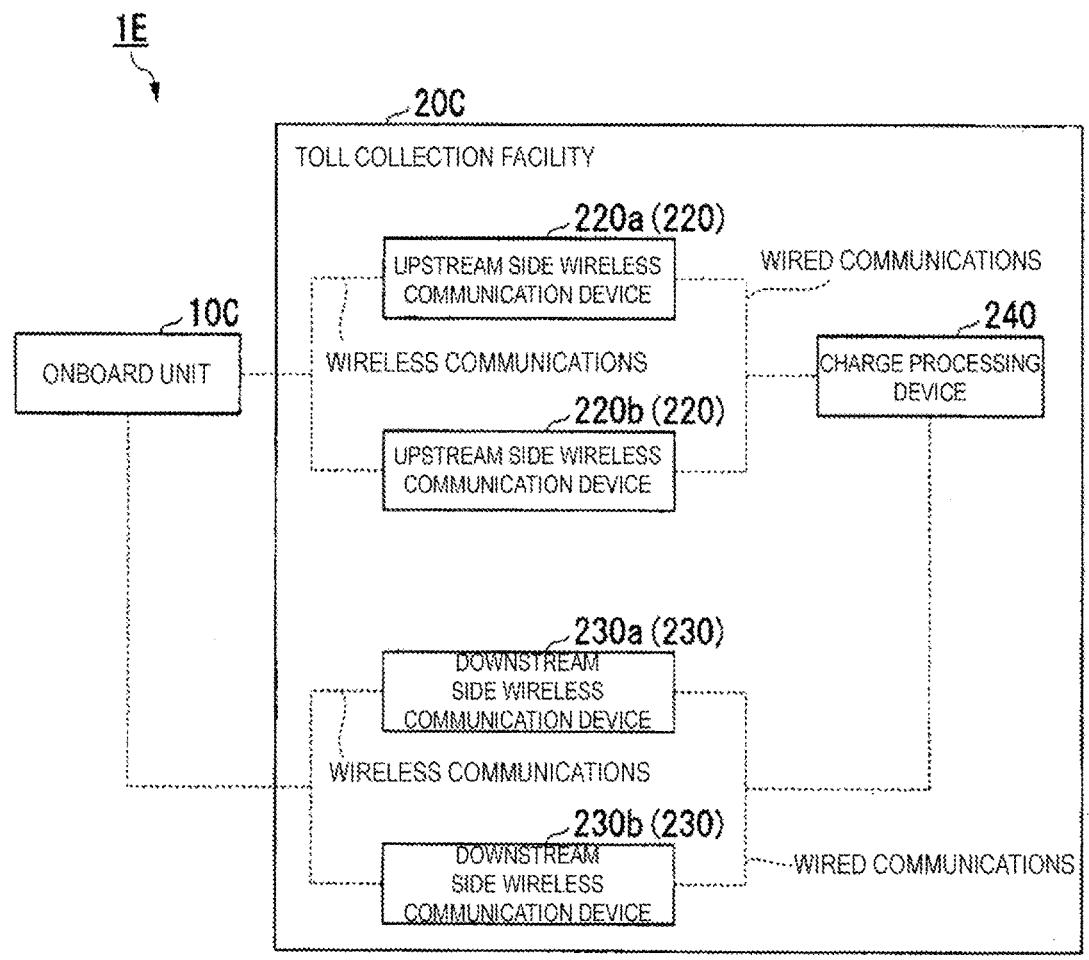
FIG. 27 is a diagram illustrating a functional configuration of the toll collection system according to the fourth embodiment of the present invention.

FIG. 27 is a diagram illustrating a functional configuration of the toll collection system according to the fourth embodiment of the present invention.

As illustrated in FIG. 26 and FIG. 27, a toll collection system 1E includes the onboard unit 10C according to the modified example of the second embodiment and a toll collection facility 20C.

As illustrated in FIG. 26, the toll collection facility 20C includes upstream side wireless communication devices 220, downstream side wireless communication devices 230, and a charge processing device 240.

The upstream side wireless communication devices 220 are attached to a gantry G1 that is on an upstream side (−X side in FIG. 26) in a lane direction and extends in a lane width direction (±Y direction in FIG. 26) to be provided over the lanes L1 and L2, and are affixed to be above the lanes L1 and L2.

The downstream side wireless communication devices 230 are attached to a gantry G2 that is on a downstream side (+X side in FIG. 26) in the lane direction and extends in a lane width direction (±Y direction in FIG. 26) to be provided over the lanes L1 and L2, and are affixed to be above the lanes L1 and L2.

In an aspect described in the present embodiment, the toll collection facility 20C includes the upstream side wireless communication devices 220 each provided for a single lane and the downstream side wireless communication devices 230 each provided for a single lane. Specifically, as illustrated in FIG. 26, the lane L1 is provided with an upstream side wireless communication device 220a and a downstream side wireless communication device 230a. The lane L2 is provided with an upstream side wireless communication device 220b and a downstream side wireless communication device 230b.

As illustrated in FIG. 27, in the present embodiment, the upstream side wireless communication devices 220 (the upstream side wireless communication devices 220a and 220b) and the downstream side wireless communication devices 230 (the downstream side wireless communication devices 230a and 230b) employ RFID communications to perform wireless communications with the onboard unit 10C.

The upstream side wireless communication devices 220 (the upstream side wireless communication devices 220a and 220b) and the downstream side wireless communication devices 230 (the downstream side wireless communication devices 230a and 230b) perform wired communications with the charge processing device 240 via a cable such as an optical fiber.

(Functional Configuration of Toll Collection Facility)

Next, a functional configuration of the toll collection facility 20C according to the present embodiment is described with reference to FIG. 28.

Figure 28:
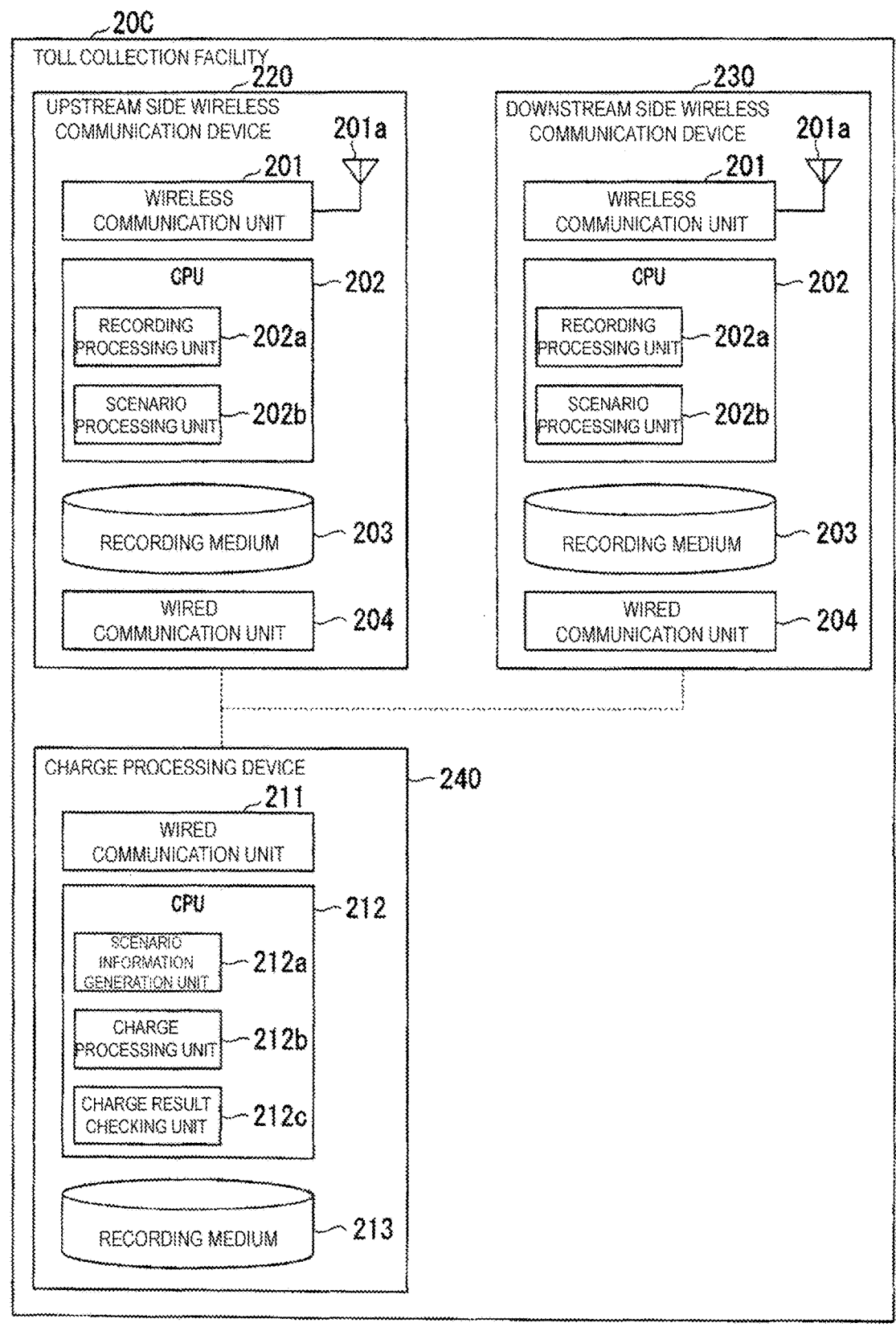
FIG. 28 is a diagram illustrating a functional configuration of a toll collection facility according to the fourth embodiment of the present invention.

FIG. 28 is a diagram illustrating a functional configuration of a toll collection facility according to the fourth embodiment of the present invention.

As illustrated in FIG. 28, the upstream side wireless communication devices 220 and the downstream side wireless communication devices 230 each include the wireless communication unit 201, the CPU 202, the recording medium (internal recording medium) 203, and the wired communication unit 204, as in the configuration of the wireless communication device 200 according to the first embodiment. The upstream side wireless communication devices 220 and the downstream side wireless communication devices 230 each has a configuration similar to that of the wireless communication device 200 according to the first embodiment.

The charge processing device 240 includes a wired communication unit 211, a CPU 212, and a recording medium (internal recording medium) 213.

The CPU 212 includes the scenario information generation unit 212a, the charge processing unit 212b, and a charge result checking unit 212c.

Only differences from the embodiments described above will be described below.

The charge processing unit 212b calculates a charge amount for the onboard unit 10C, based on the "charge processing data D1" acquired from the onboard unit 10C via the upstream side wireless communication device 220. The charge processing unit 212b generates "new charge processing data" including a "new charge processing history" and a "new balance". The "new charge processing history" includes a charge amount as well as the date and time and location at which the charge amount has been calculated. The "new balance" is obtained by subtracting the charge amount from the "balance" before the charge processing. The charge processing unit 212b sends a write command for the "new charge processing data" to the onboard unit 10C via the upstream side wireless communication device 200.

The charge processing unit 212b generates "check data", and sends the check data to the downstream side wireless communication device 230 via the wired communication unit 211. In the check data, the "new charge processing data" and the "card number" in the "charge processing data D1" are associated with each other. The downstream side wireless communication device 230 records the received "check data" in the recording medium 203.

The charge result checking unit 212c executes processing of checking the charge result to check whether the "new charge processing data" generated by the charge processing unit 212b is appropriately written to the card C inserted in the onboard unit 10C. Specifically, the charge result checking unit 212c determines that the "new charge processing data" has been appropriately updated and the charge result is normal, when the received "check data" matches the "charge processing data D1" acquired from the onboard unit 10C via the downstream side wireless communication device 230. On the other hand, the charge result checking unit 212c determines that the card C has not been appropriately updated and the charge result is abnormal when the received "check data" does not match the "charge processing data D1" acquired from the onboard unit 10C via the downstream side wireless communication device 230.

Upon determining that an abnormality has occurred in the charge processing, the charge result checking unit 212c records the "charge processing data D1", acquired from the onboard unit 10C via the downstream side wireless communication device 230, as "abnormal data" in the recording medium 213.

Upon determining that the charge result is abnormal, the charge result checking unit 212c executes abnormality processing of issuing a notification indicating the "abnormal data" to an administrator and the like of the toll collection facility 20C. In this process, the charge result checking unit 212c may send the notification to a central management server or the like (not illustrated) in wired connection with the toll collection facility 20C. The administrator or the like executes processing of disabling the card C associated with the "card number" in the "abnormal data", charging the charge amount to the owner of the card C, and the like, based on the notification.

(Processing Flow of Toll Collection Facility)

Figure 29:
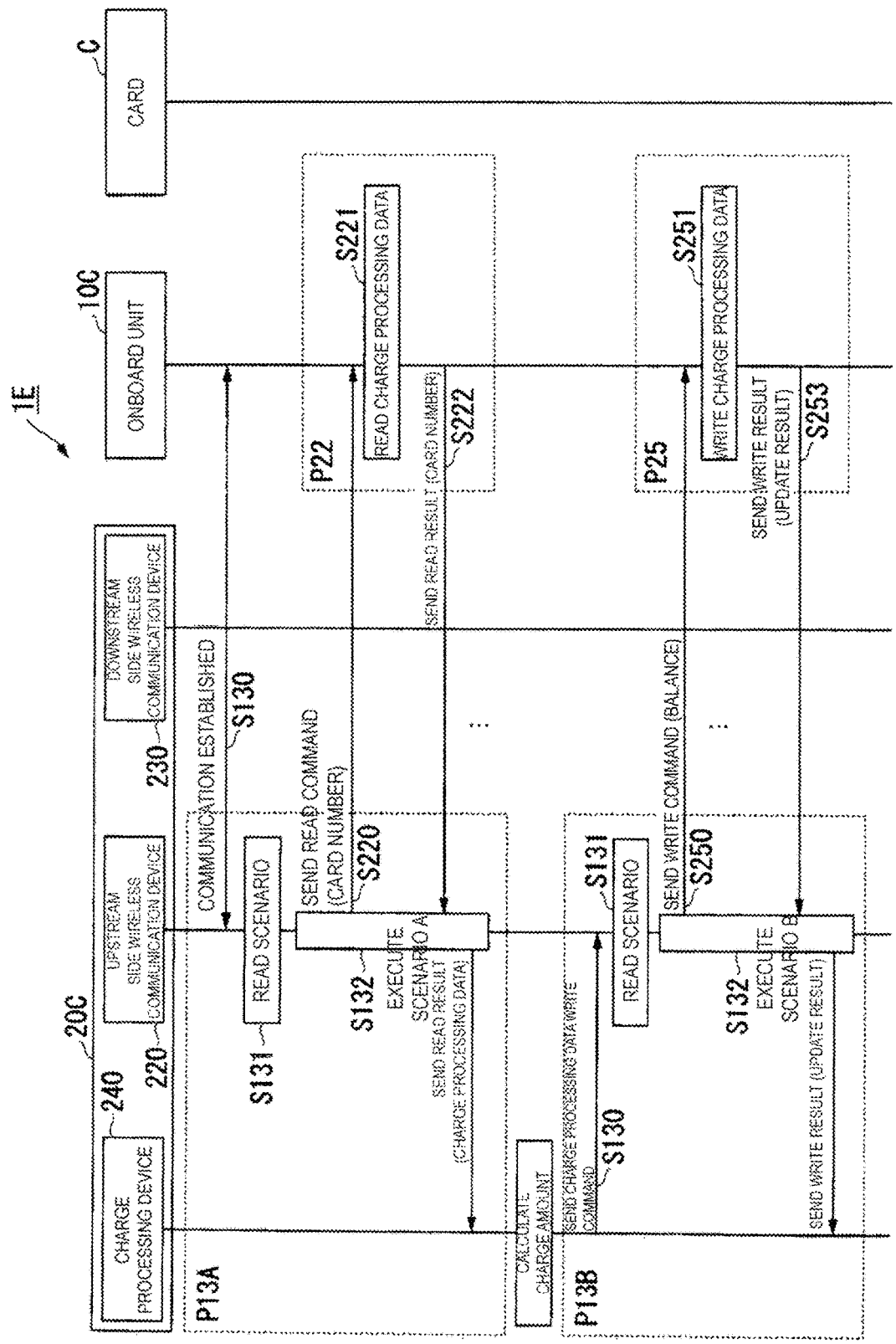
FIG. 29 is a first diagram explaining functions of the toll collection system according to the fourth embodiment of the present invention.

FIG. 29 is a first diagram explaining functions of the toll collection system according to the fourth embodiment of the present invention.

Figure 30:
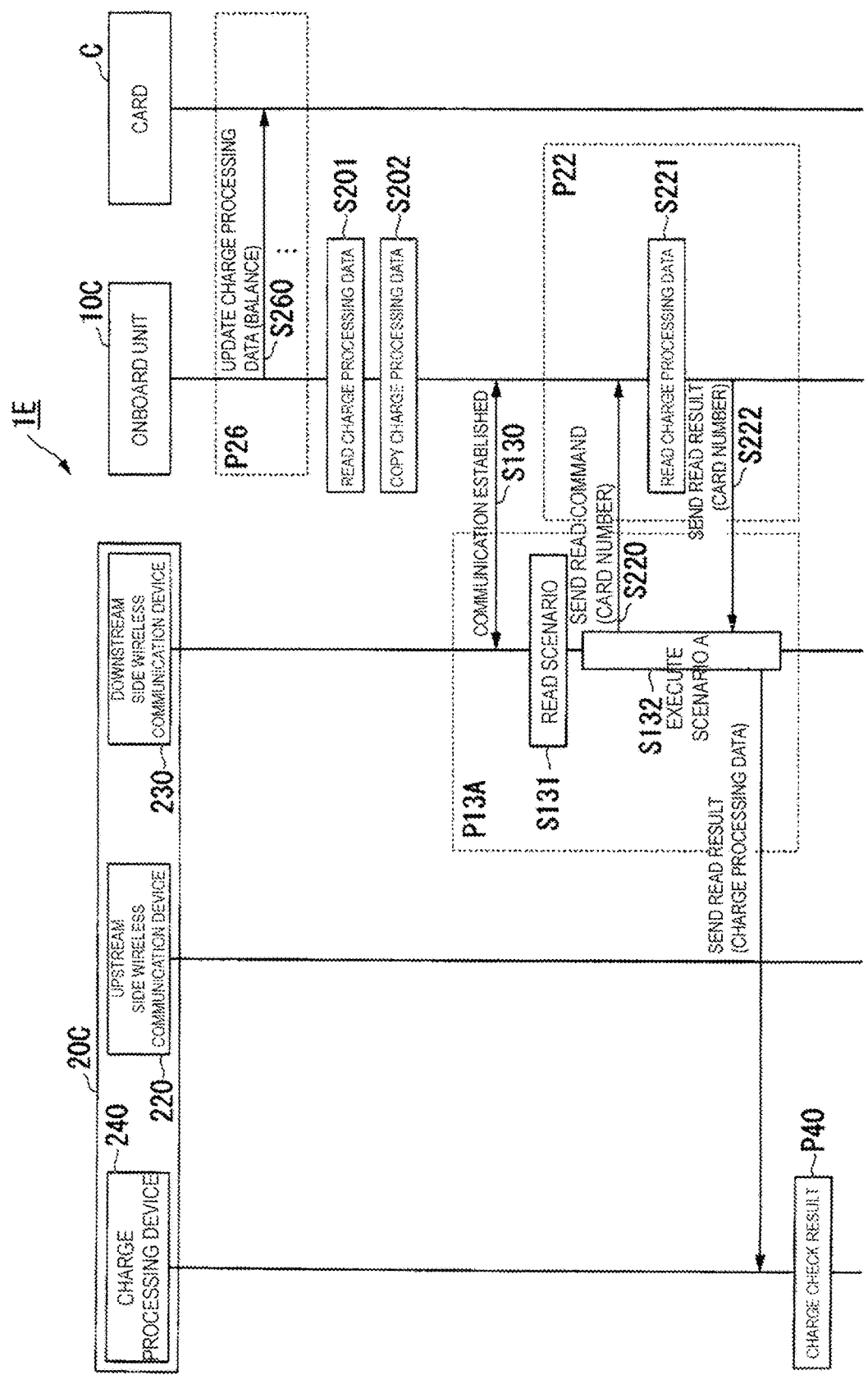
FIG. 30 is a second diagram explaining the functions of the toll collection system according to the fourth embodiment of the present invention.

FIG. 30 is a second diagram explaining the functions of the toll collection system according to the fourth embodiment of the present invention.

Figure 31:
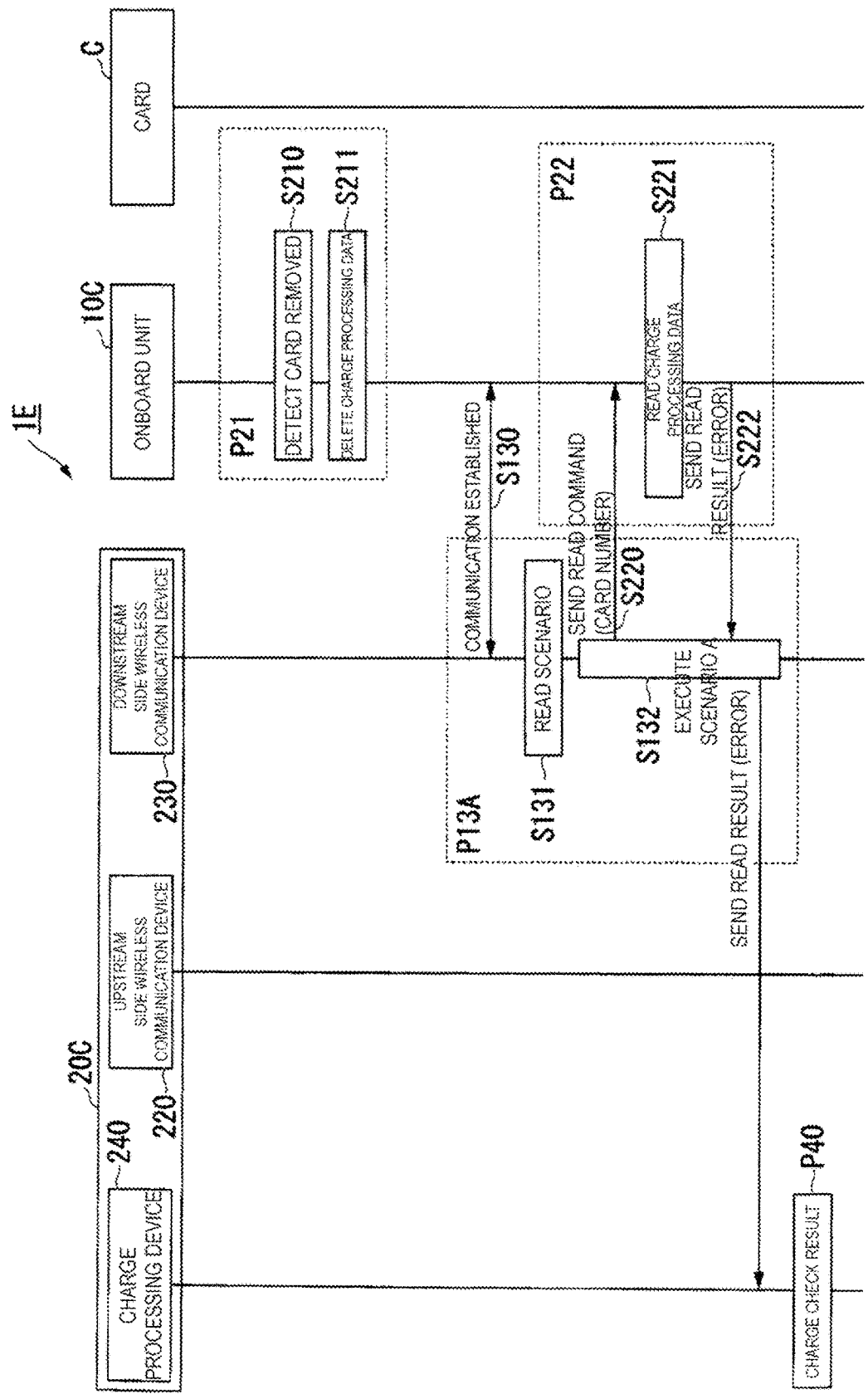
FIG. 31 is a third diagram explaining the functions of the toll collection system according to the fourth embodiment of the present invention.

FIG. 31 is a third diagram explaining the functions of the toll collection system according to the fourth embodiment of the present invention.

Figure 32:
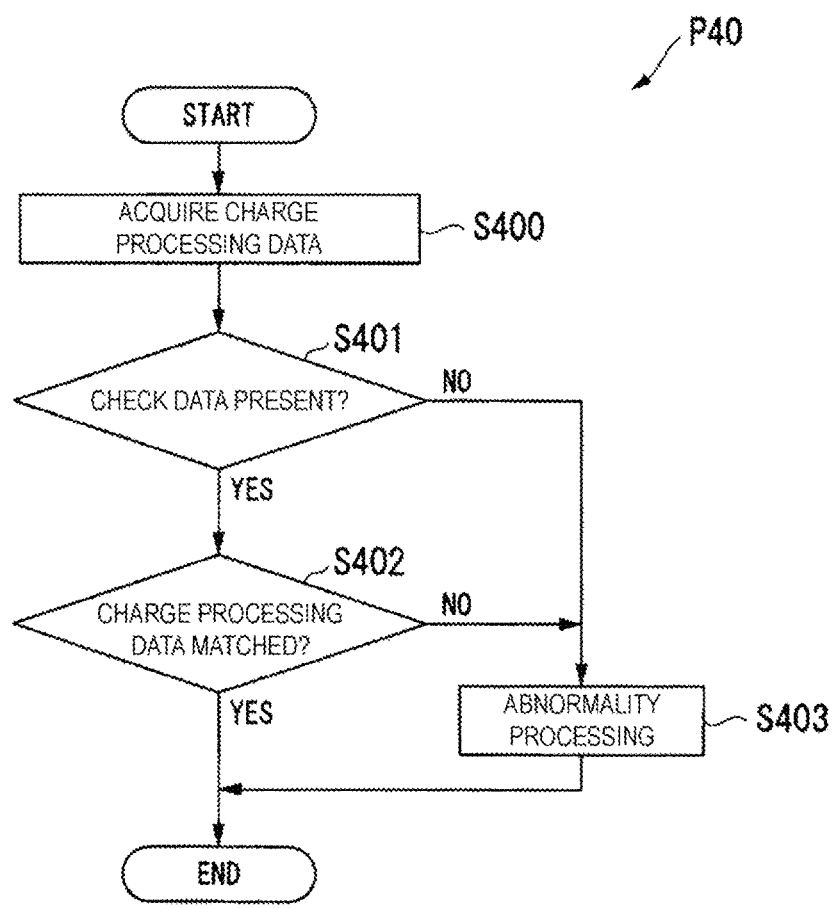
FIG. 32 is a diagram illustrating a processing flow of a charge result checking unit according to the fourth embodiment of the present invention.

FIG. 32 is a diagram illustrating a processing flow of a charge result checking unit according to the fourth embodiment of the present invention.

Each processing executed by the toll collection system 1E according to the present embodiment is described below with reference to FIG. 29 to FIG. 32.

As illustrated in FIG. 29, the toll collection facility 20C executes the "processing P13A of acquiring charge processing data" (FIGS. 10 and 12) when the vehicle A with the onboard unit 10C enters the communicable area of the upstream side wireless communication device 220.

Specifically, upon receiving the signal indicating the "establishment of communications with onboard unit" (step S130), the scenario processing unit 202b of the upstream side wireless communication device 220 selects and reads the scenario information D2 including a "trigger signal" matching the received signal, from the plurality of pieces of scenario information D2 recorded in the recording medium 203 (step S131). Then, the scenario processing unit 202b executes a series of processing procedures based on the "processing procedure" recorded in the read scenario information D2 (scenario A) (step S132).

Upon receiving a read command (READ command) for the "charge processing data D1" from the upstream side wireless communication device 220 of the toll collection facility 20C, the onboard unit 10C executes the "read processing P22 for charge processing data" (FIG. 18 to FIG. 19) based on the read command. Specifically, upon receiving a read command (READ command) for the "charge processing data D1" from the upstream side wireless communication device 220 (step S220, step S223: YES), the read processing unit 132 of the onboard unit 10C reads the "charge processing data D1" recorded in the recording medium 120 (step S221). Then, the read processing unit 132 sends the read "charge processing data D1" to the toll collection facility 20C via the wireless communication unit 100 (step S222).

Next, upon acquiring the "charge processing data D1" from the onboard unit 10C, the upstream side wireless communication device 220 of the toll collection facility 20C sends the "charge processing data D1" to the charge processing device 210. Upon executing all of a series of processing procedures in the scenario information D2 (scenario A), the scenario processing unit 202b terminates the "processing P13A of acquiring charge processing data".

Next, the charge processing unit 212b of the charge processing device 240 calculates a charge amount for the onboard unit 10C based on the "charge processing data D1" acquired from the onboard unit 10C via the upstream side wireless communication device 220. The charge processing unit 212b generates the "new charge processing data" based on the calculated charge amount, and sends the "new charge processing data" to the upstream side wireless communication device 220 together with the charge processing data write command. The charge processing unit 212b generates the "check data" with the "new charge processing data" and the "card number" in the "charge processing data D1" associated with each other, and sends the "check data" to the downstream side wireless communication device 230.

Upon receiving the charge processing data write command from the charge processing device 240, the scenario processing unit 202b of the upstream side wireless communication device 220 starts the "processing P13B of writing charge processing data to onboard unit" (FIG. 11 and FIG. 12). Specifically, upon receiving a signal indicating the "charge processing data write command" sent from the charge processing device 240 (step S130), the scenario processing unit 202b selects and reads the scenario information D2 (scenario B) including a "trigger signal" matching the received signal, from the plurality of pieces of scenario information D2 recorded in the recording medium 203 (step S131). Then, the scenario processing unit 202b executes a series of processing procedures (step S132) based on the "processing procedure" recorded in the read scenario information D2 (scenario B).

Upon receiving a write command (WRITE command) for the "charge processing data D1" from the upstream side wireless communication device 220 of the toll collection facility 20C, the onboard unit 10C executes the "processing P25 of writing new charge processing data" (FIG. 22 and FIG. 23) based on the write command, Upon receiving a write command for the "new charge processing history" (step S250, step S252: YES), the write processing unit 133 of the onboard unit 10C writes the "new charge processing history", received from the upstream side wireless communication device 220 together with the write command, to the "charge processing data D1" recorded in the recording medium 120 (step S251).

Upon determining that no next command is received from the toll collection facility 20B (step S252: NO), the write processing unit 133 sends an update result indicating that the writing of the "new charge processing data" is completed to the toll collection facility 20B (step S253). The write processing unit 133 issues a notification indicating that the "charge processing data D1" recorded in the recording medium 120 has been updated to the card update unit 134. Then, the onboard unit 10C terminates the "processing P25 of writing new charge processing data", and terminates the communications with the toll collection facility 20B.

Next, as illustrated in FIG. 30, the card update unit 134 starts the "processing P26 of updating charge processing data" (FIG. 22 and FIG. 23) upon receiving the notification from the write processing unit 133.

The card update unit 134 performs updating by writing the information written by the write processing unit 133, in the "charge processing data D1" recorded in the recording medium 120, to the card C via the card R/W 110 (step S260).

Upon entirely updating the "charge processing data D1", the card update unit 134 terminates the "processing P26 of updating charge processing data".

The copy processing unit 131 may execute the "processing P20 of copying charge processing data" (FIG. 16 and FIG. 17), after the card update unit 134 has terminated the "processing P26 of updating charge processing data". This configuration ensures that the content of the "charge processing data D1" copied to the recording medium 120 of the onboard unit 10C matches the content of the "charge processing data D1" recorded in the card C.

When the vehicle A with the onboard unit 10C enters the communicable area of downstream side wireless communication device 230, the toll collection facility 20C executes the "processing P13A of acquiring charge processing data" from the onboard unit 10C (FIGS. 10 and 12).

Specifically, upon receiving a signal indicating the "establishment of wireless communication with onboard unit" sent (step S130), the scenario processing unit 202b of the downstream side wireless communication device 230 selects and reads the scenario information D2 including a "trigger signal" matching the received signal, from the plurality of pieces of scenario information D2 recorded in the recording medium 203 (step S131). Then, the scenario processing unit 202b executes a series of processing procedures (step S132) based on the "processing procedure" recorded in the read scenario information D2 (scenario A).

Upon receiving a read command (READ command) for the "charge processing data D1" from the downstream side wireless communication device 230 of the toll collection facility 20C, the onboard unit 10C executes the "read processing P22 for new charge processing data" (FIG. 18 and FIG. 19) based on the read command.

Upon receiving a read command (READ command) for the "charge processing data D1" from the downstream side wireless communication device 230 (step S220, step S223: YES), the read processing unit 132 of the onboard unit 10C reads the "charge processing data D1" recorded in the recording medium 120 (step S221). Then, the read processing unit 132 sends the read "charge processing data D1" to the toll collection facility 20C via the wireless communication unit 100 (step S222).

Next, upon acquiring the "charge processing data D1" from the onboard unit 10C, the downstream side wireless communication device 230 of the toll collection facility 20C sends the "charge processing data D1" to the charge processing device 240. Upon executing all of a series of processing procedures in the scenario information D2 (scenario A), the scenario processing unit 202b terminates the "processing P13A of acquiring charge processing data".

Next, the the charge result checking unit 212c of the charge processing device 240 executes "processing P40 of checking charge result".

As illustrated in FIG. 32, the charge result checking unit 212c acquires the "charge processing data D1" from the onboard unit 10C via the downstream side wireless communication device 230.

Specifically, when the vehicle A with the onboard unit 10C enters the communicable area of the downstream side wireless communication device 230, the downstream side wireless communication device 230 executes the "processing P13A of acquiring charge processing data" used for the charge processing from the onboard unit 10C (FIGS. 10 and 12).

Upon receiving a read command (READ command) for the "charge processing data D1" from the downstream side wireless communication device 230 of the toll collection facility 20C, the onboard unit 10C executes the "read processing P22 for new charge processing data" (FIG. 18 and FIG. 19) based on the read command, Upon acquiring the "charge processing data D1" from the onboard unit 10C, the upstream side wireless communication device 220 of the toll collection facility 20C sends the "charge processing data D1" to the charge processing device 240. Upon executing all of a series of processing procedures in the scenario information D2 (scenario A), the scenario processing unit 202b terminates the "processing P13A of acquiring charge processing data".

Next, the charge result checking unit 212c determines whether the "check data" recorded in the recording medium 203 includes "check data" having information matching the "card number" in the "charge processing data D1" acquired from the onboard unit 10C via the downstream side wireless communication device 230. (step S401).

When there is the "check data" having the information matching the "card number" in the "charge processing data D1" acquired from the onboard unit 10C (step S401: YES), the charge result checking unit 212c acquires the "check data" and proceeds to the next step S402. When there is no "check data" having the information matching the "card number" in the "charge processing data D1" acquired from the onboard unit 10C (step S401: NO), the charge result checking unit 212c proceeds to step S403.

Next, as illustrated in FIG. 32, the charge result checking unit 212c determines whether the acquired "check data" matches the "charge processing data D1" received from the onboard unit 10C via the downstream side wireless communication device 230 (step S402).

When the "check data" does not match the "charge processing data D1" (step S402: NO), the charge result checking unit 212c proceeds to the next step S403. On the other hand, when the "check data" and the "charge processing data D1" match (step S402: YES), the charge result checking unit 212c determines that the charge result is normal, and terminates the "processing P40 of checking charge result".

When there is no "check data" having the information matching the "card number" in the "charge processing data D1" acquired from the onboard unit 10C (step S401: NO), or when the "check data" does not match the "charge processing data D1" (step S402: NO), the charge result checking unit 212c determines that the charge result is abnormal, and records the "charge processing data D1" as "abnormal data" in the recording medium 213.

The charge result checking unit 212c executes the abnormality processing of issuing a notification indicating the "abnormal data" to the administrator or the like of the toll collection facility 20C (step S403).

In the example illustrated in FIG. 29 and FIG. 30, the "charge processing data D1" updated based on the "new charge processing data" received from the upstream side wireless communication device 220 is recorded in the card C and the recording medium 120 of the onboard unit 10C.

As described above, there is the "check data" having the information matching the "card number" in the "charge processing data D1" acquired from the onboard unit 10C (step S401: YES), and the "check data" and the "charge processing data D1" match (step S402: YES). Thus the charge result checking unit 212c determines that the charge result is normal and terminates the "processing P40 of checking charge result".

On the other hand, when the card C is removed after the write processing unit 133 of the onboard unit 10C has executed the "processing P25 of writing new charge processing data" (FIG. 22 and FIG. 23) and before the card update unit 134 starts the "processing P26 of updating charge processing data", the copy processing unit 131 of the onboard unit 10C executes the "processing P21 of deleting charge processing data" (FIG. 16 and FIG. 17).

In this case, the "charge processing data D1" is not recorded in the card C or in the recording medium 120 of the onboard unit 10C. Thus, the downstream side wireless communication device 230 cannot receive appropriate charge processing data from the onboard unit 10C. Because there is no "check data" having the information matching the "card number" (no data) in the "charge processing data D1" acquired from the onboard unit 10C (step S401: NO), the charge result processing unit 212c determines that the charge result is abnormal and thus executes the abnormality processing (step S403).

When a trouble such as a failure in the "processing P26 of updating charge processing data" executed by the card update unit 134 of the onboard unit 10C occurs, the "charge processing data D1" recorded in the card C includes information (for example, "balance" before the charge amount is subtracted) different from the "new charge processing data" (for example, "new balance" as a result of subtracting the charge amount from "balance"). In this case, there is the "check data" having the information matching the "card number" in the "charge processing data D1" acquired from the onboard unit 10C but the "check data" does not match the content of the "charge processing data D1" (step S402: NO). Thus, the charge result processing unit 212c determines that the charge result is abnormal, and executes the abnormality processing (step S403).

Operational Effects

As described above, the toll collection facility 20C according to the present embodiment includes the wireless communication device including the upstream side wireless communication device 220 provided on the upstream side along the lanes L1 and L2 and the downstream side wireless communication device 230 provided on the downstream side along the lanes L1 and L2. The charge processing device 240 includes the charge result checking unit 212c that determines that the write processing was not appropriately executed on the onboard unit 10C when the "new charge processing data" related to the write processing executed on the onboard unit 10C by the upstream side wireless communication device 220 does not match the "charge processing data D1" related to the read processing executed on the onboard unit 10C by the downstream side wireless communication device 230.

With this configuration, the charge result checking unit 212c can recognize whether the write processing has been appropriately executed on the onboard unit 10C by the upstream side wireless communication device 220 based on the "charge processing data D1" acquired from the onboard unit 10C via the downstream side wireless communication device 230 even when the write processing for the "new charge processing data" is executed after the communications with the upstream side wireless communication device 220 have been terminated so that the communication time between the onboard unit 10C and the toll collection facility 20C can be shortened.

Thus, the charge result checking unit 212c can recognize that the "new charge processing data" has failed to be correctly written to the card C, even when a trouble such as the card C being removed occurs after the onboard unit 10C has terminated the communications with the upstream side wireless communication device 220 and before the card update unit 134 of the onboard unit 10C executes the "processing P26 of updating charge processing data".

The charge result checking unit 212c executes the abnormality processing of issuing a notification indicating that the charge result is abnormal to the administrator and the like of the toll collection facility 20C. With this configuration, the administrator and the like can recognize that the "new charge processing data" has failed to be correctly written to the card C and can recognize information such as the "card number" enabling the card C to be identified, and can execute processing of disabling the card C associated with the "card number" and charging the charge amount to the owner of the card C.

In the foregoing, certain embodiments of the present invention have been described, but these embodiments are merely illustrative and are not intended to limit the scope of the invention. These embodiments may be implemented in various other forms, and various omissions, substitutions, and alterations may be made without departing from the gist of the invention. These embodiments and modified examples are included in the scope and gist of the invention and are also included in the scope of the invention described in the claims and equivalents thereof.

For example, in the aspects described in the above embodiments, the toll road includes a plurality of lanes (the lane L1 and the lane L2), and a single wireless communication device 200, a single upstream side wireless communication device 220, and/or a single downstream side wireless communication device 230 is provided to each of the lanes. However, this should not be construed in a limiting sense. In an alternative embodiment, the number of lanes may be one or three or more. In this case, one or three or more wireless communication devices 200, one or three or more upstream side wireless communication devices 220, and/or one or three or more downstream side wireless communication device 230 may be provided based on the number of lanes.

In the aspects described in the above embodiments, the toll collection systems 1A to 1E are installed in an exit tollgate of a toll road. In an alternative embodiment, an aspect where the toll collection system is installed in an entrance tollgate may be employed.

In the aspects described in the above embodiments, the toll collection facilities 20A and 20C perform wireless communications to send and receive the "charge processing data D1" to and from the onboard units 10A to 10C serving as communication target devices. However, this should not be construed in a limiting sense. The toll collection facilities 20A and 20C may perform wireless communications to send and receive the "charge processing data D1" to and from an RF tag, capable of performing RFID communications to send and receive information, serving as the communication target device. With this configuration, the toll collection facilities 20A and 20C can be introduced to tollgates using the RF tag to execute the charge processing.

INDUSTRIAL APPLICABILITY

The above-described toll collection facility, onboard unit, toll collection system, toll collection method, and program enable charge processing to be efficiently executed.

REFERENCE SIGNS LIST 1A,1B,1C,1D,1E Toll collection system
10A,10B,10C Onboard unit (communication target device)
100 Wireless communication unit
100a RFID antenna
110 Card R/W
120 Recording medium (internal recording medium)
130 CPU
131 Copy processing unit
132 Read processing unit
133 Write processing
134 Card update unit
20A,20B,20C Toll collection facility
200,200a,200b Wireless communication device
201 Wireless communication unit
201a RFID antenna
202 CPU
202a Recording processing unit
202b Scenario processing unit
203 Recording medium (internal recording medium)
204 Wired communication unit
210, 240 Charge processing device
211 Wired communication unit
212 CPU
212a Scenario information generation unit
212b Charge processing unit
212c Charge result checking unit
213 Recording medium (internal recording medium)
220, 220a, 220b Upstream side wireless communication device
230, 230a, 230b Downstream side wireless communication device
A Vehicle
C Card (card-type portable recording medium)
G, G1, G2 Gantry
L1, L2 Lane

The invention claimed is:

1. A toll collection facility comprising:
a wireless communication device provided to a lane; and
a charge processing device configured to execute read processing and write processing, for charge processing data, on a communication target device installed in a vehicle traveling on the lane, via the wireless communication device, based on a predetermined processing procedure, wherein
the charge processing device includes a scenario information generation unit configured to generate and send scenario information including a trigger signal and the predetermined processing procedure indicating a combination of a plurality of commands and a plurality of responses that the wireless communication device transmits to and receives from the communication target device and the charge processing device when the wireless communication device receives the trigger signal for each of the read processing and the write processing, and
the wireless communication device includes
a recording processing unit configured to record the scenario information received from the charge processing device, in an internal recording medium, and
a scenario processing unit configured to execute read processing to read the charge processing data from the communication target device and write processing to write the charge processing data generated by the charge processing device into the communication target device based on the scenario information recorded in the internal recording medium and associated with the trigger signal received from the charge processing device or the wireless communication device.

2. The toll collection facility according to claim 1, wherein the scenario information generation unit is configured to generate and send the scenario information when the charge processing device starts.

3. A toll collection system comprising:
the toll collection facility according to claim 1; and
an onboard unit, comprising:
a wireless communication unit configured to wirelessly send and receive data;
a copy processing unit configured to read, when a card-type portable recording medium is inserted, charge processing data recorded in the card-type portable recording medium and copy the charge processing data in an internal recording medium;
a read processing unit configured to read and send, when a read command for the charge processing data is received via the wireless communication unit, the charge processing data copied in the internal recording medium;
a write processing unit configured to write, when a write command for new charge processing data is received via the wireless communication unit, the received new charge processing data to the internal recording medium; and
a card update unit configured to update, after the new charge processing data has been written to the internal recording medium, the charge processing data recorded in the card-type portable recording medium, based on the new charge processing data written to the internal recording medium.

4. The toll collection system according to claim 3, wherein
the toll collection facility includes the wireless communication device including: an upstream side wireless communication device provided on an upstream side on the lane; and a downstream side wireless communication device provided more on a downstream side on the lane than the upstream side wireless communication device, and
the charge processing device includes a charge result checking unit configured to determine that the write processing on the communication target device has failed to be correctly performed, when the charge processing data related to write processing on the communication target device executed by the upstream side wireless communication device does not match the charge processing data related to read processing on the communication target device executed by the downstream side wireless communication device.

5. A toll collection method executed by using a wireless communication device provided to a lane and a charge processing device configured to execute read processing and write processing, for charge processing data, on a communication target device installed in a vehicle traveling on the lane, via the wireless communication device based on a predetermined processing procedure, the toll collection method comprising:

generating and sending, by the charge processing device, scenario information including a trigger signal and the predetermined processing procedure indicating a combination of a plurality of commands and a plurality of responses that the wireless communication device transmits to and receives from the communication target device and the charge processing device when the wireless communication device receives the trigger signal for each of the read processing and the write processing;

recording, by the wireless communication device, the scenario information in an internal recording medium; and executing, by the wireless communication device, read processing to read the charge processing data from the communication target device and write processing to write the charge processing data generated by the charge processing device into the communication target device, based on the scenario information recorded in the internal recording medium and associated with the trigger signal received from the charge processing device or the wireless communication device.

* * * * *